March 22, 1966     O. V. DRTINA     3,241,511
BOAT HULLS, MOTOR-PROPELLER UNITS AND HYDROFOIL COMBINATIONS
Filed Feb. 20, 1964     17 Sheets-Sheet 1
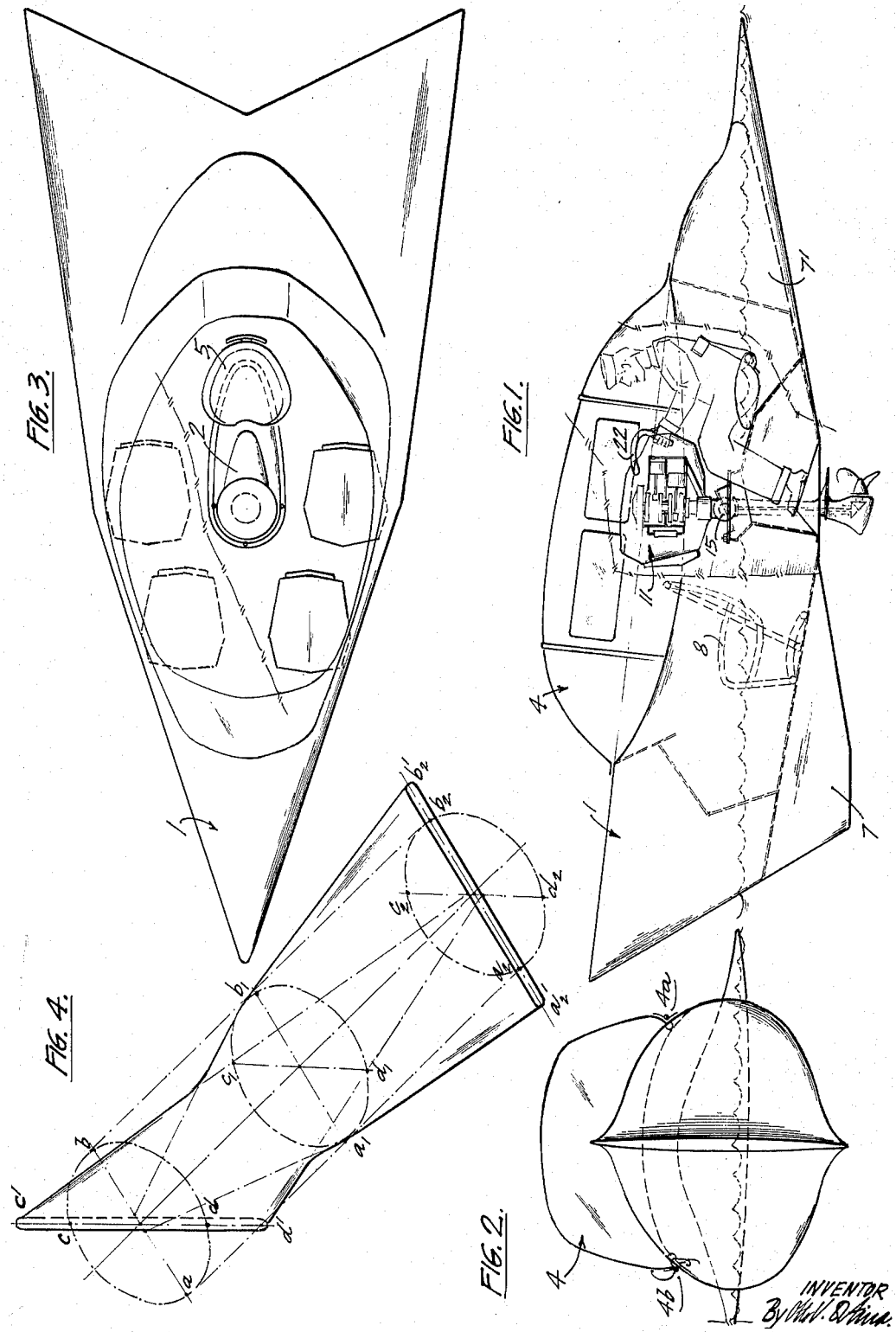
INVENTOR

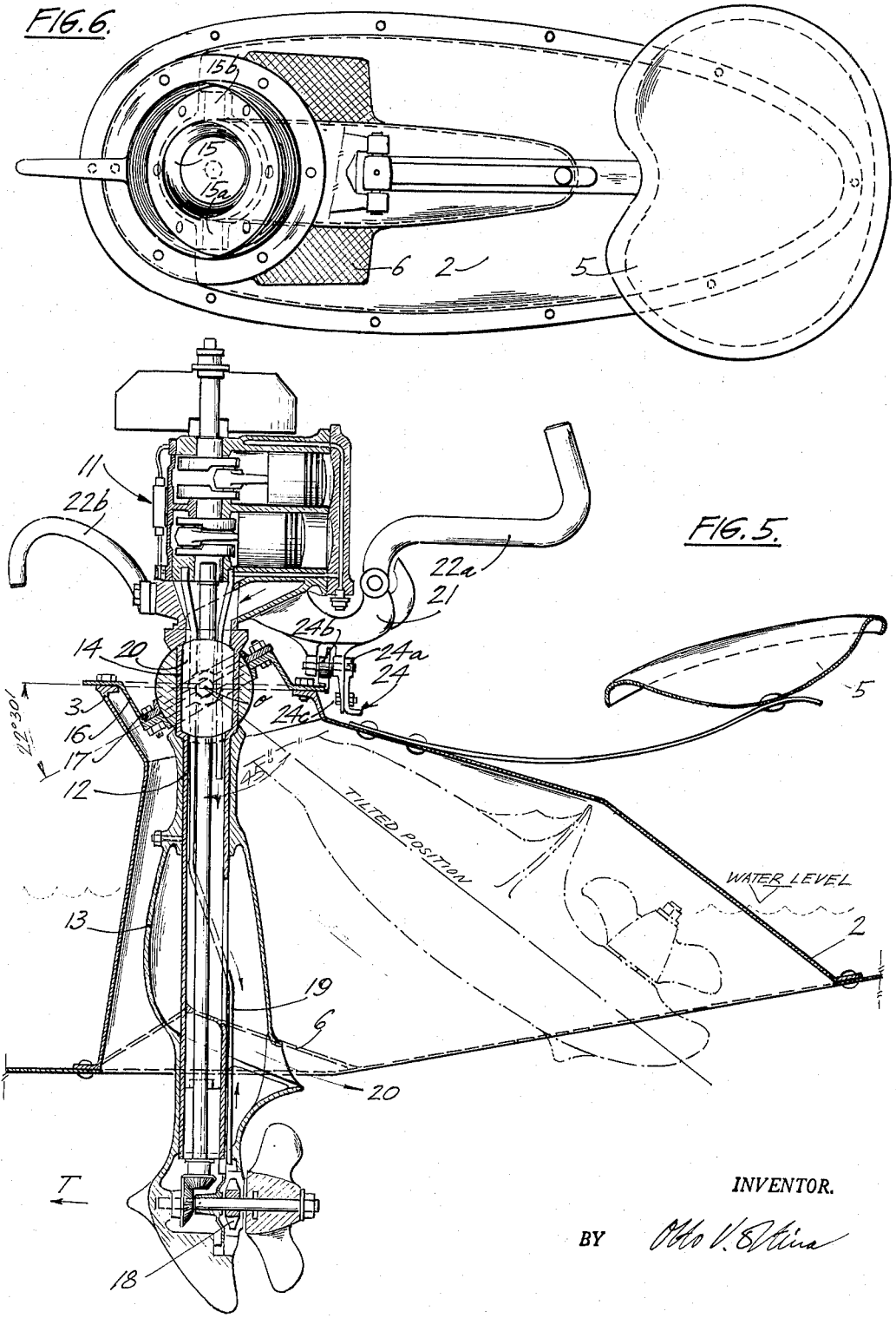

March 22, 1966  O. V. DRTINA  3,241,511
BOAT HULLS, MOTOR-PROPELLER UNITS AND HYDROFOIL COMBINATIONS
Filed Feb. 20, 1964  17 Sheets-Sheet 3
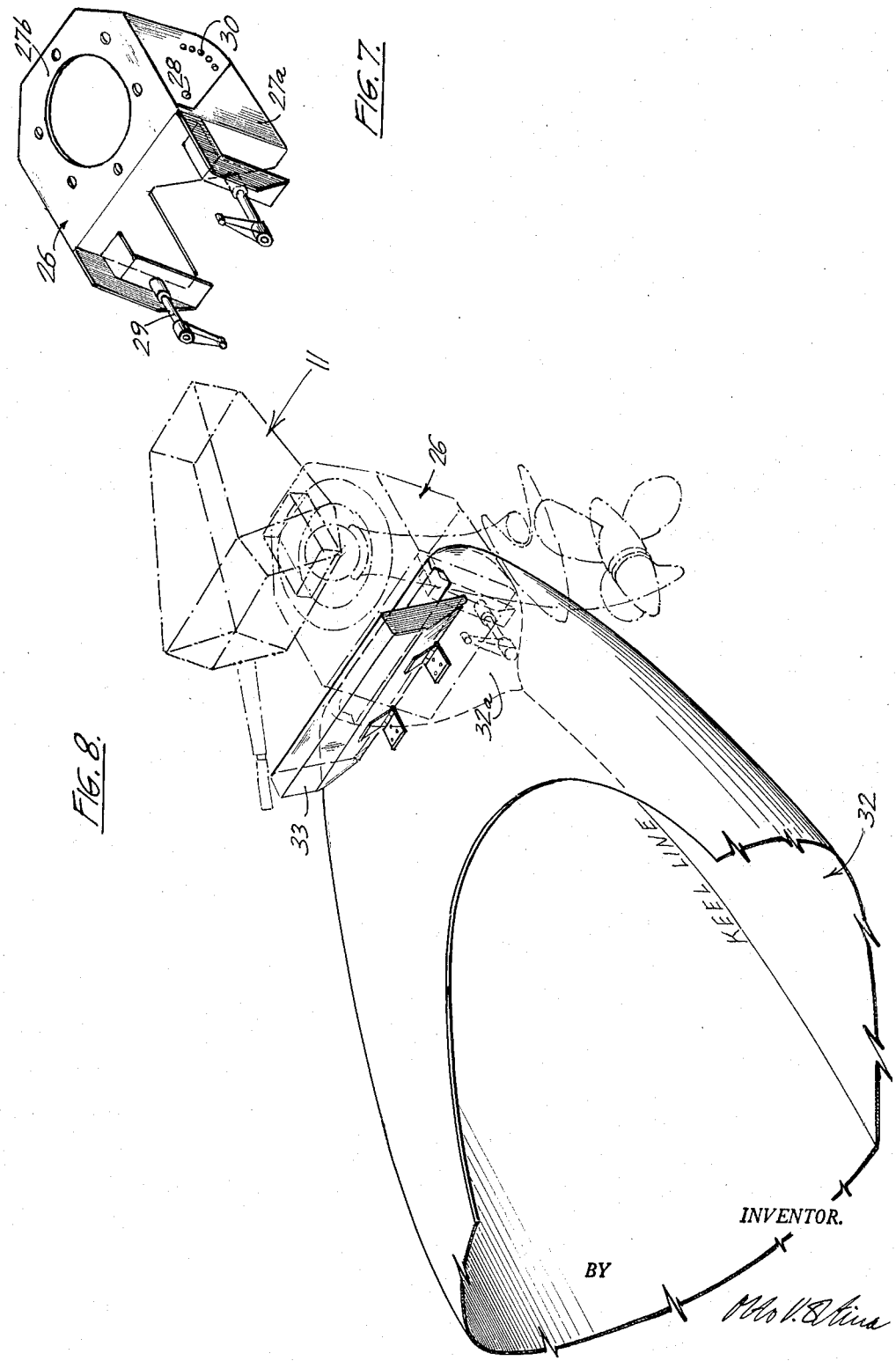
INVENTOR.
BY

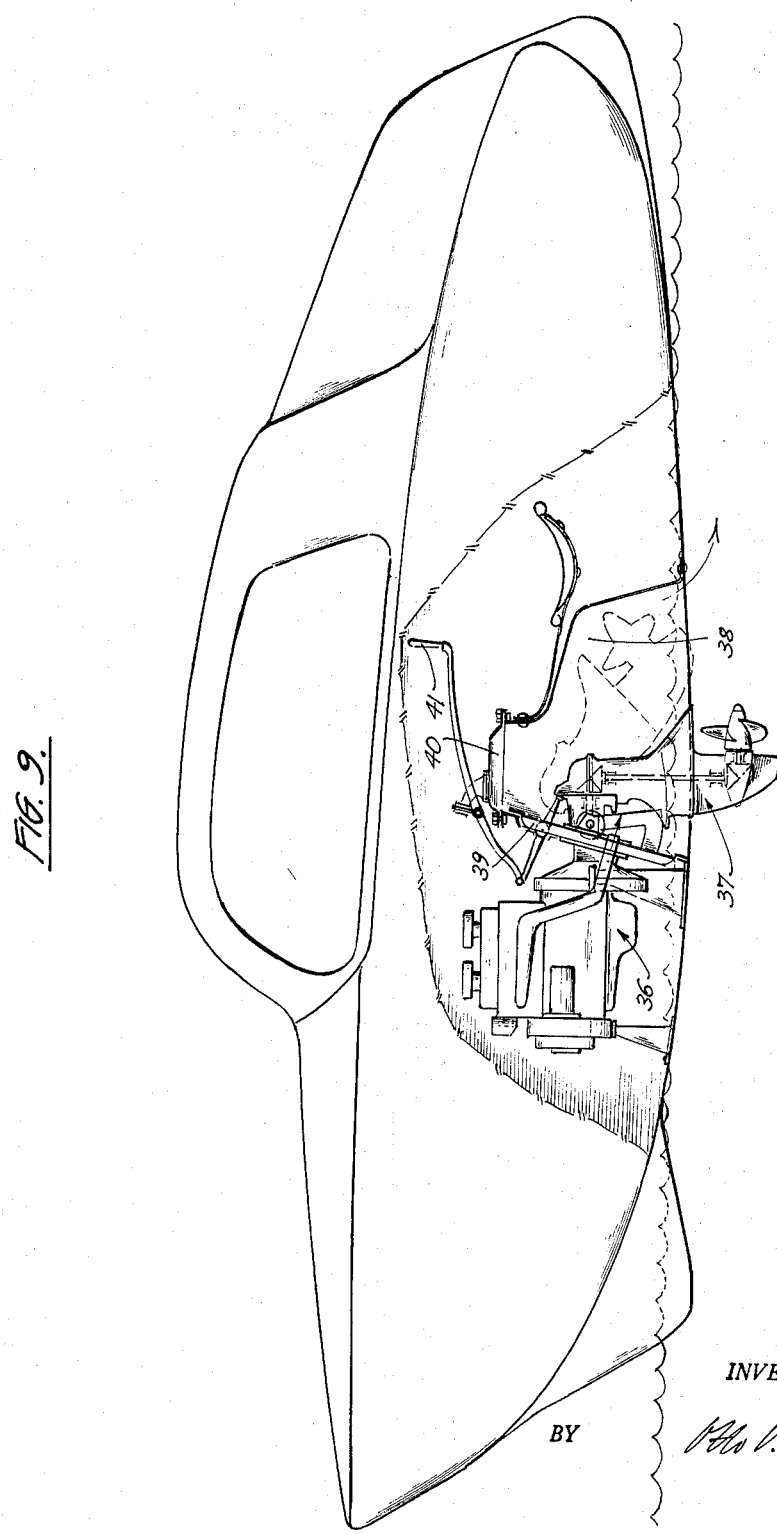

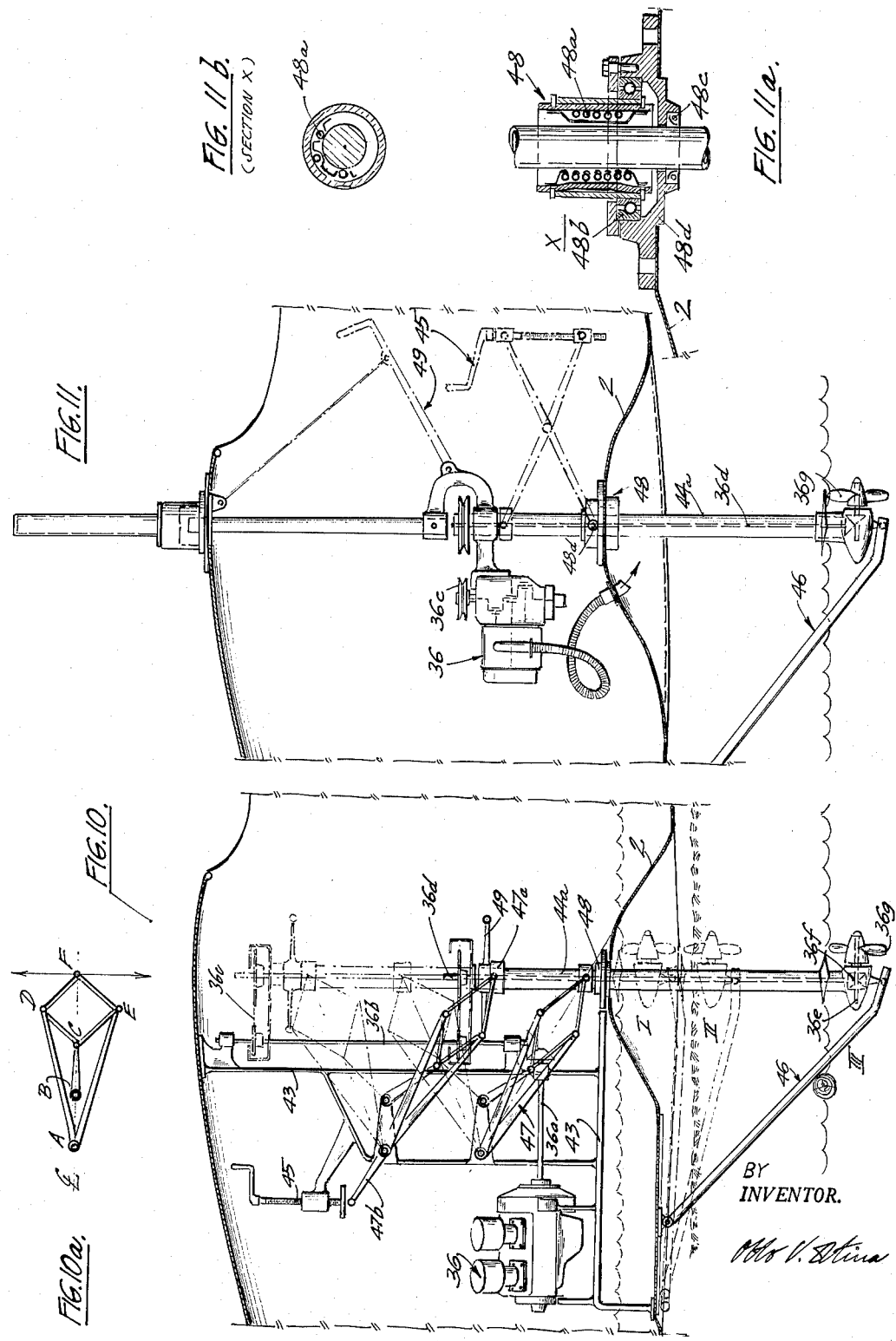

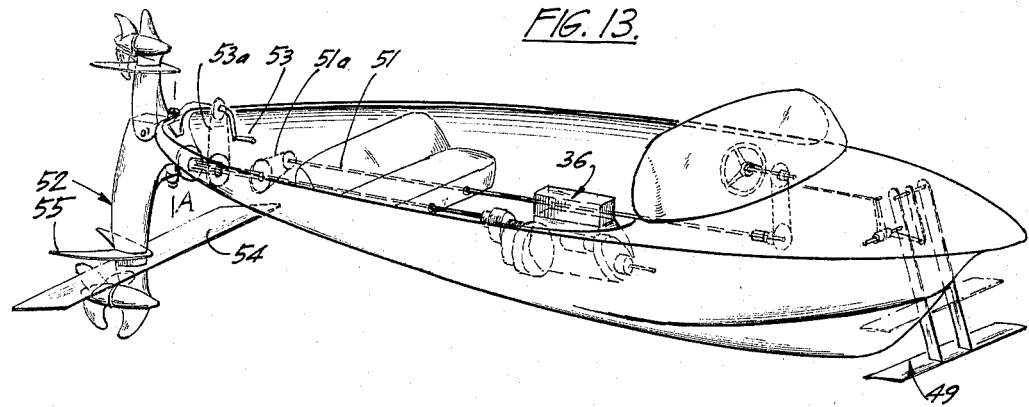
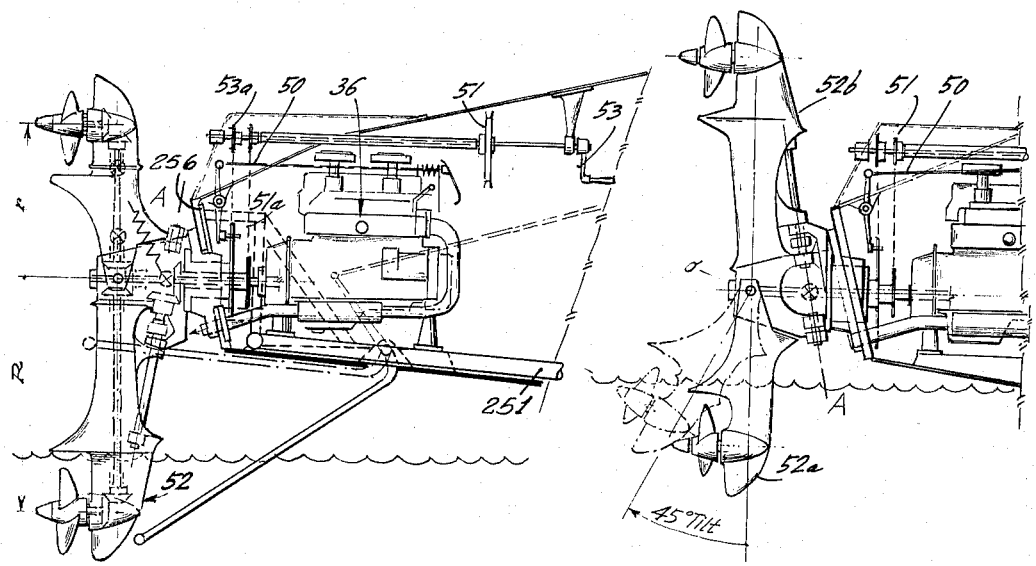

March 22, 1966 O. V. DRTINA 3,241,511
BOAT HULLS, MOTOR-PROPELLER UNITS AND HYDROFOIL COMBINATIONS
Filed Feb. 20, 1964 17 Sheets-Sheet 7

INVENTOR.
BY Otto V. Drtina

March 22, 1966 O. V. DRTINA 3,241,511
BOAT HULLS, MOTOR-PROPELLER UNITS AND HYDROFOIL COMBINATIONS
Filed Feb. 20, 1964 17 Sheets-Sheet 8

INVENTOR.
BY

March 22, 1966  O. V. DRTINA  3,241,511
BOAT HULLS, MOTOR-PROPELLER UNITS AND HYDROFOIL COMBINATIONS
Filed Feb. 20, 1964  17 Sheets-Sheet 9
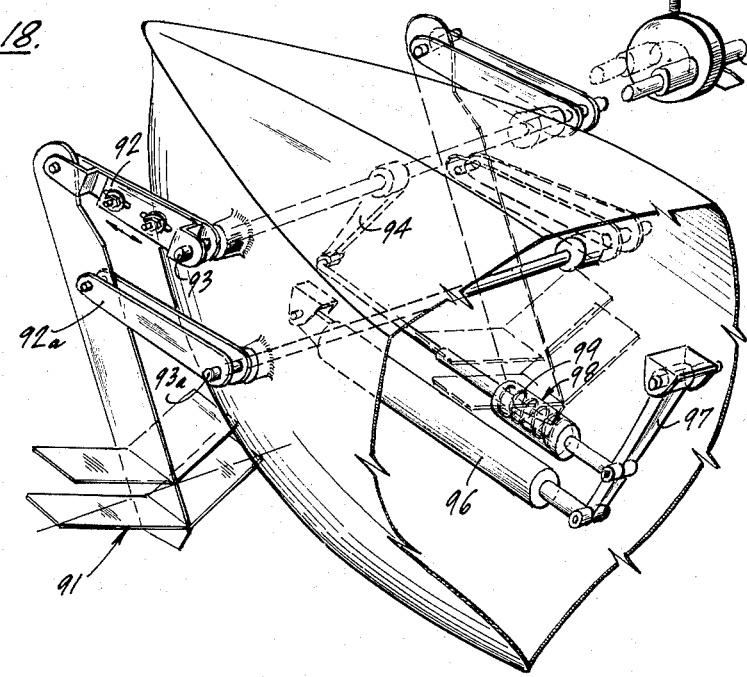
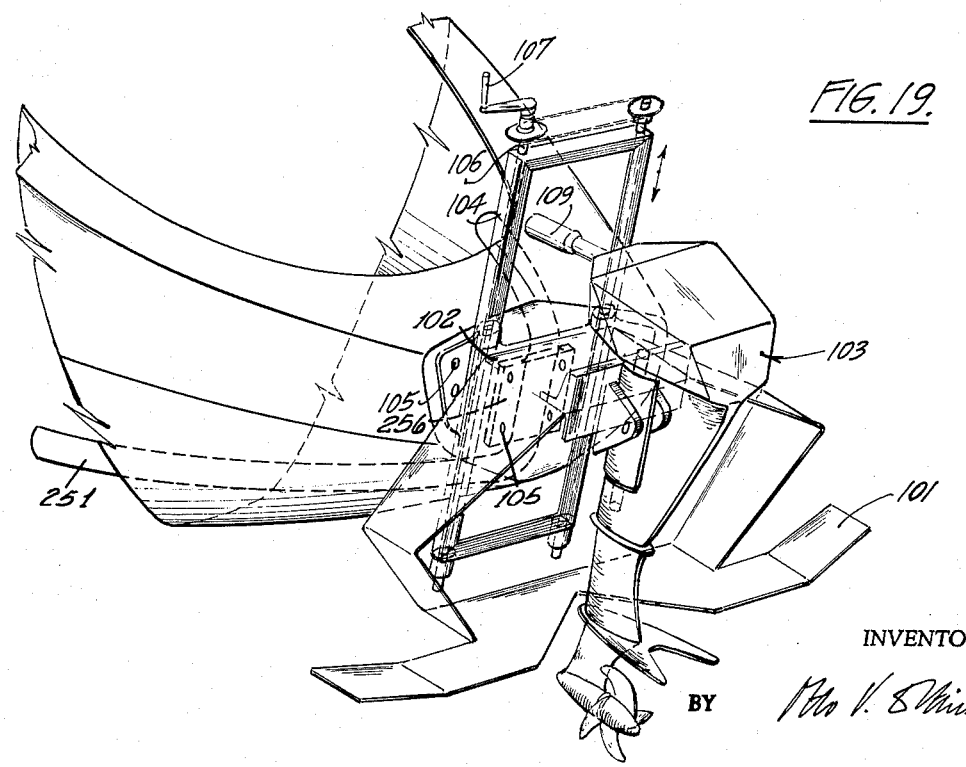
INVENTOR.
BY

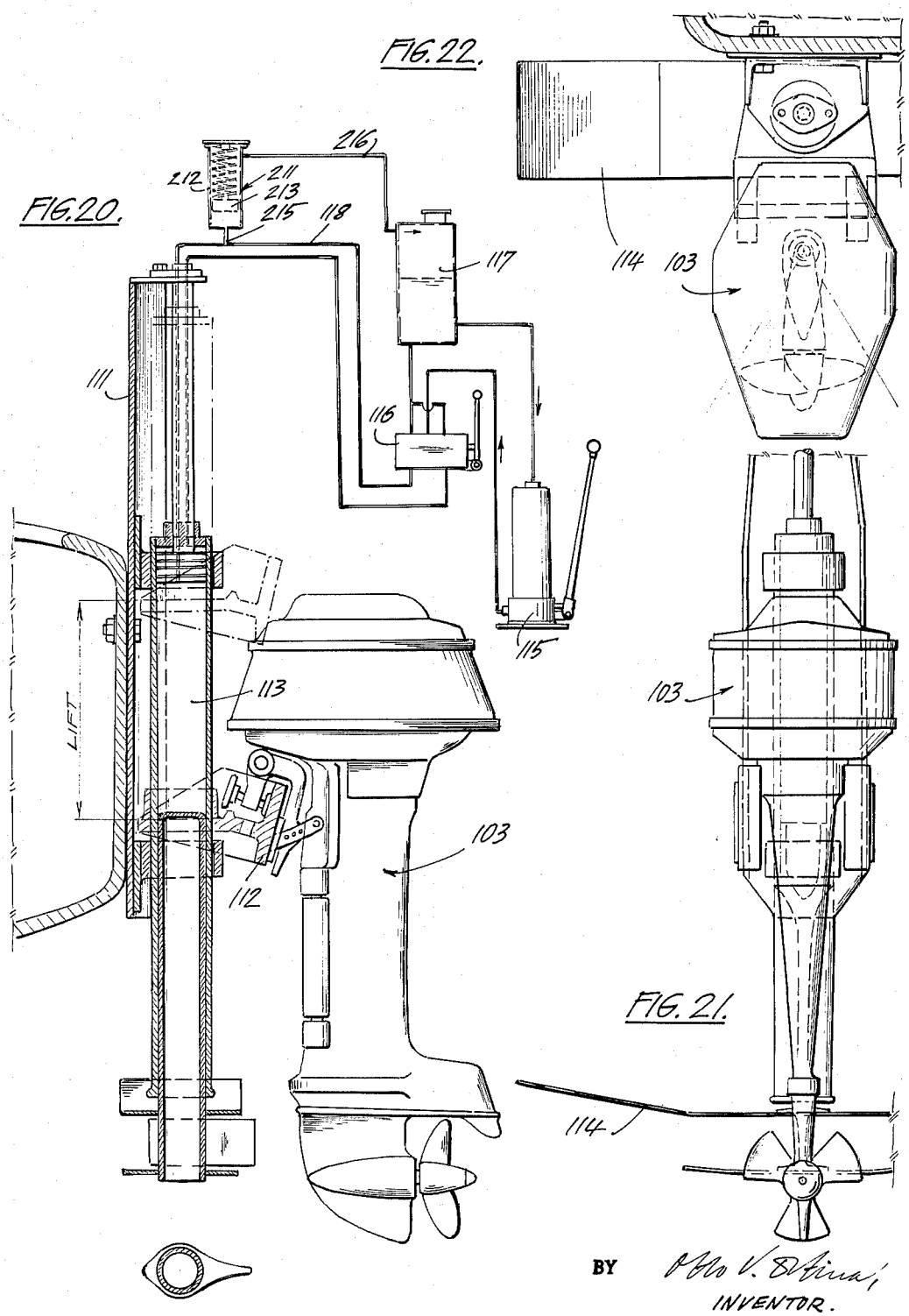

March 22, 1966  O. V. DRTINA  3,241,511
BOAT HULLS, MOTOR-PROPELLER UNITS AND HYDROFOIL COMBINATIONS
Filed Feb. 20, 1964  17 Sheets-Sheet 11
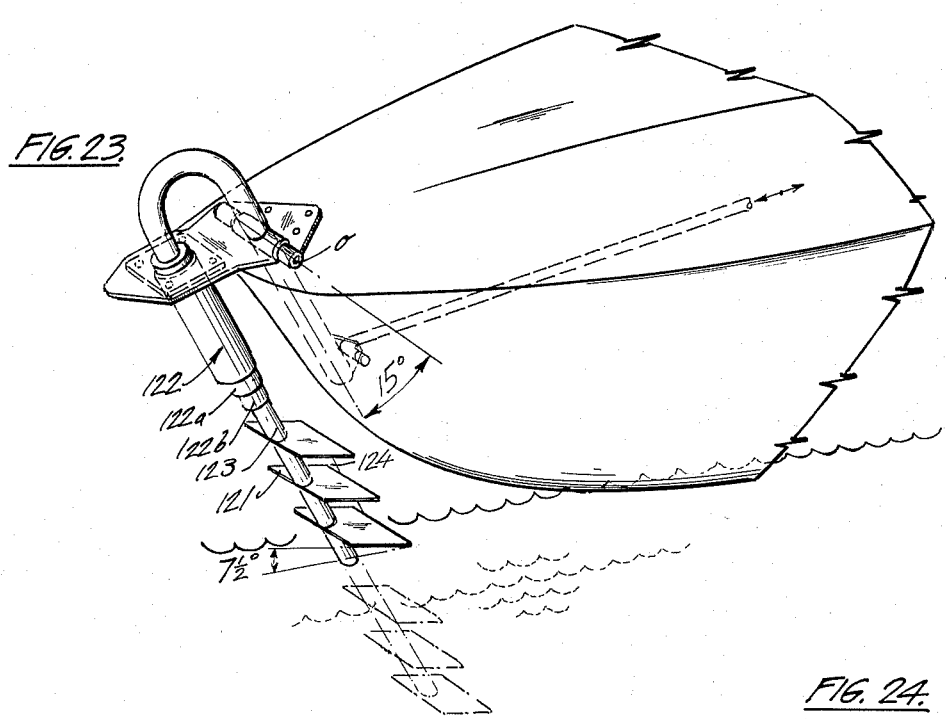
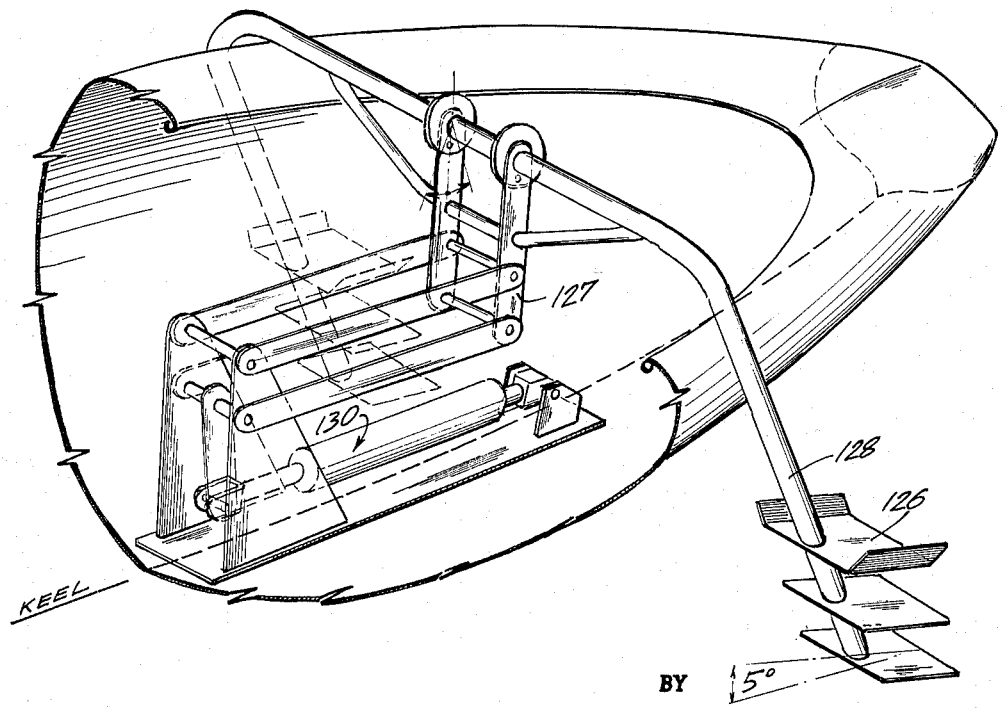
BY

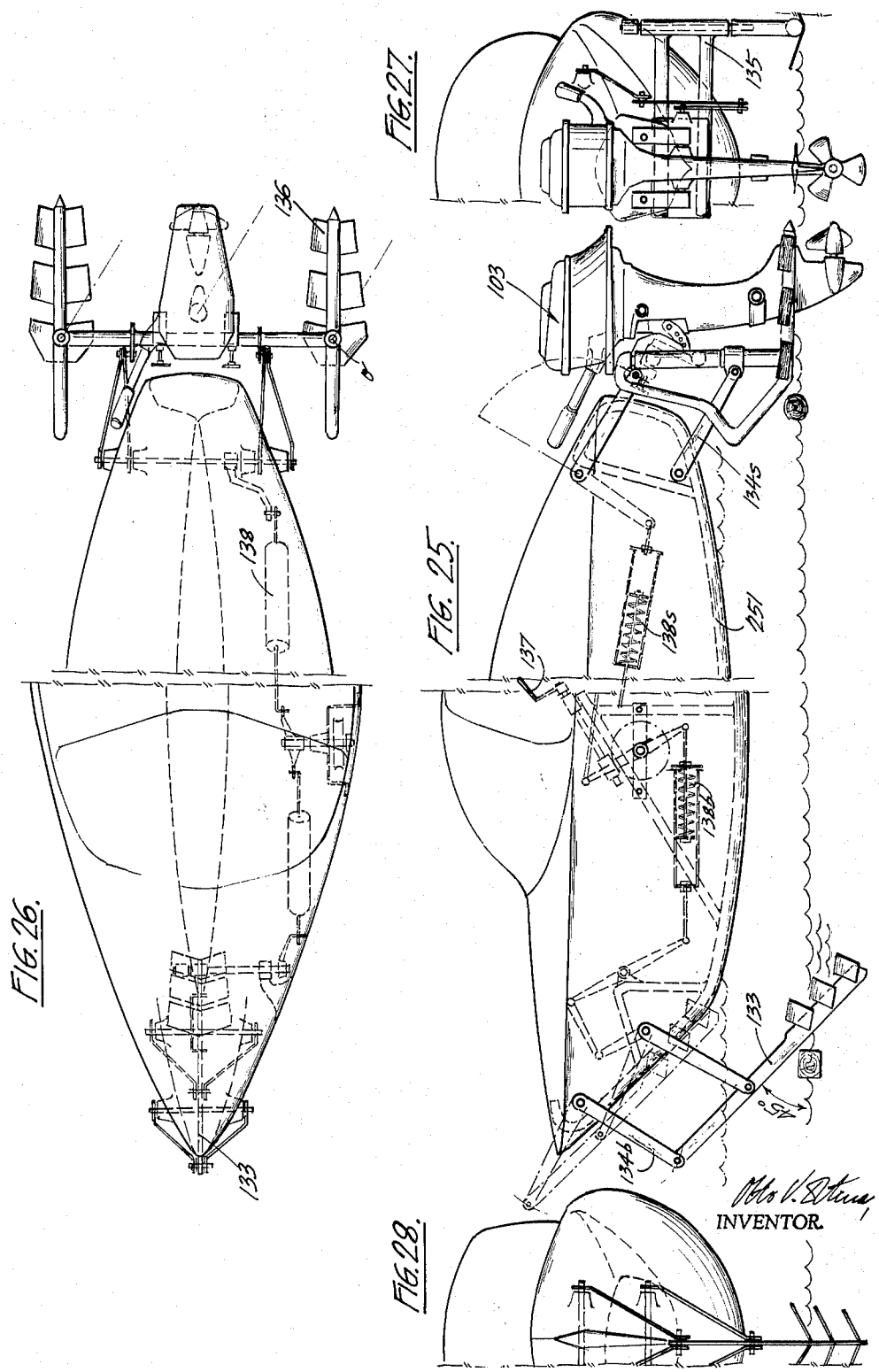

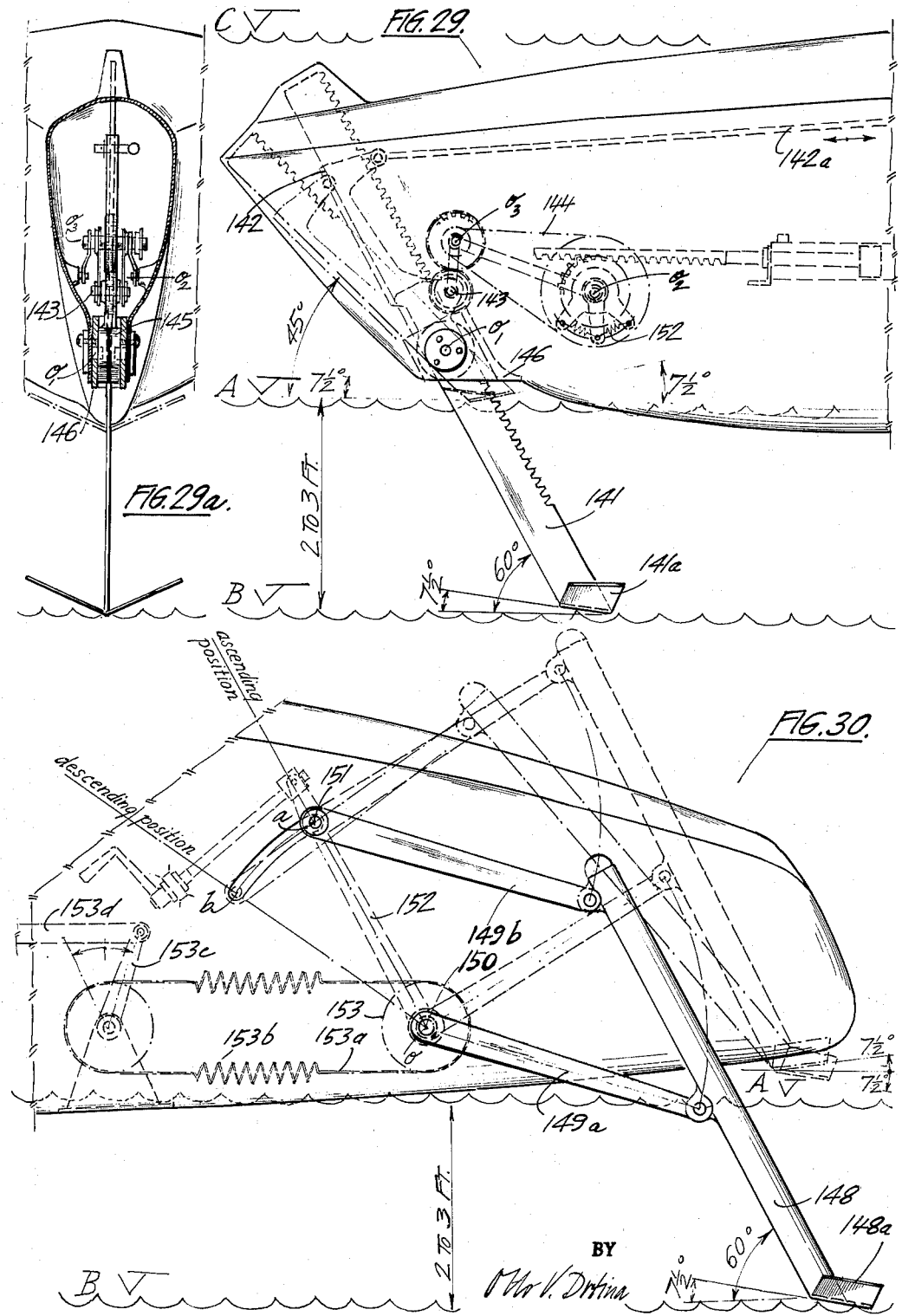

March 22, 1966        O. V. DRTINA        3,241,511
BOAT HULLS, MOTOR-PROPELLER UNITS AND HYDROFOIL COMBINATIONS
Filed Feb. 20, 1964        17 Sheets-Sheet 14
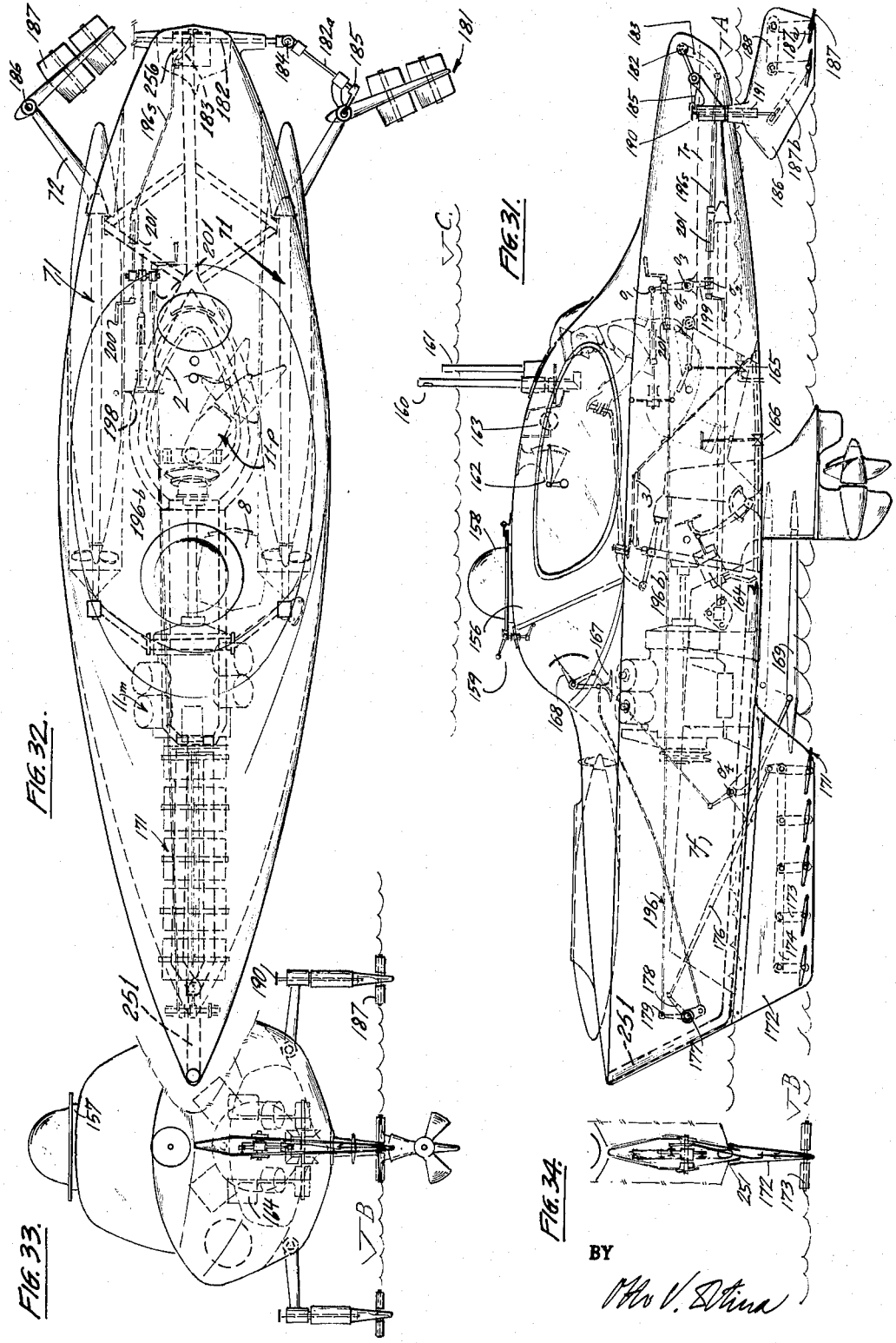
BY
*Otto V. Drtina*

March 22, 1966 O. V. DRTINA 3,241,511
BOAT HULLS, MOTOR-PROPELLER UNITS AND HYDROFOIL COMBINATIONS
Filed Feb. 20, 1964 17 Sheets-Sheet 15
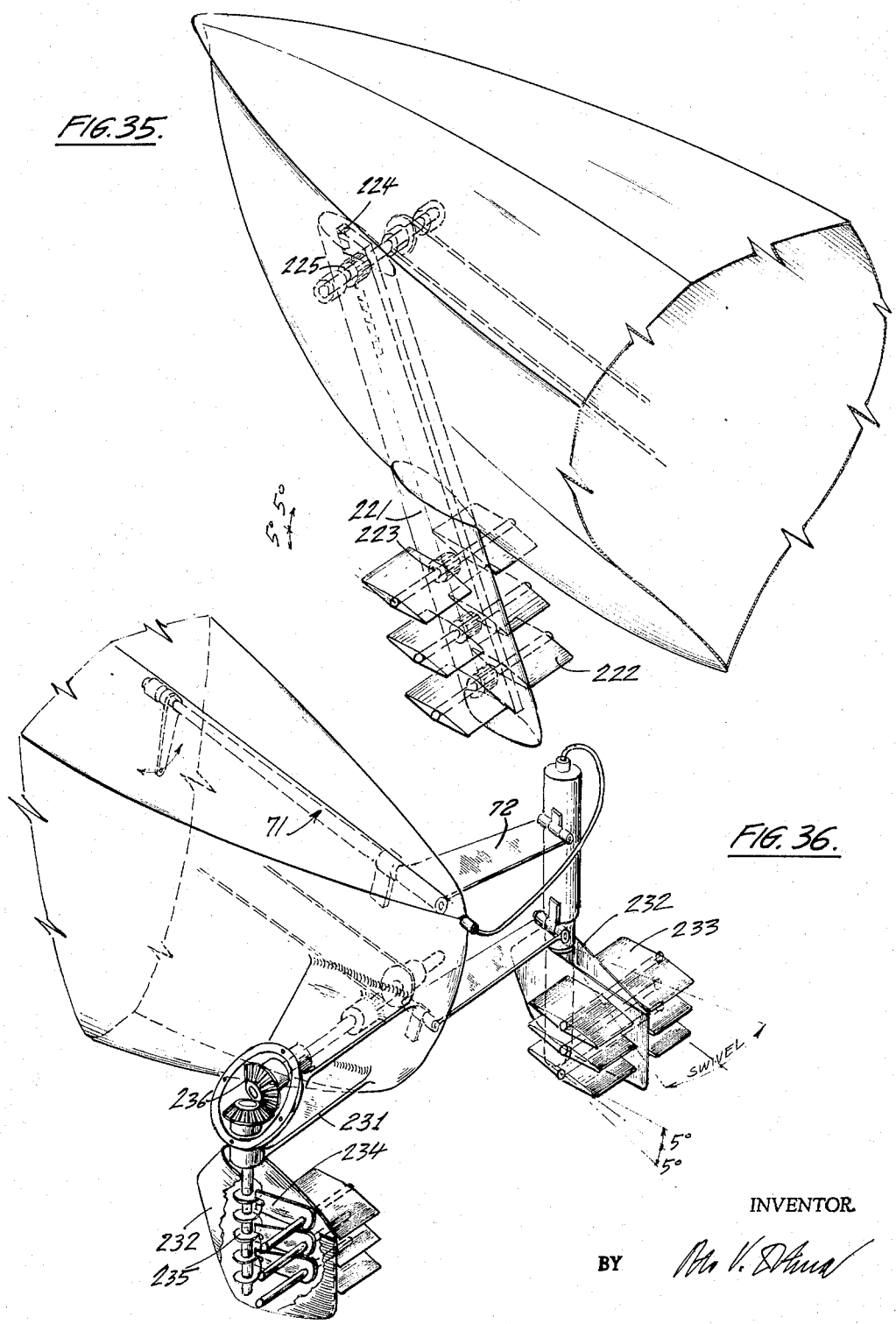
INVENTOR.
BY March 22, 1966     O. V. DRTINA     3,241,511
BOAT HULLS, MOTOR-PROPELLER UNITS AND HYDROFOIL COMBINATIONS
Filed Feb. 20, 1964     17 Sheets-Sheet 16
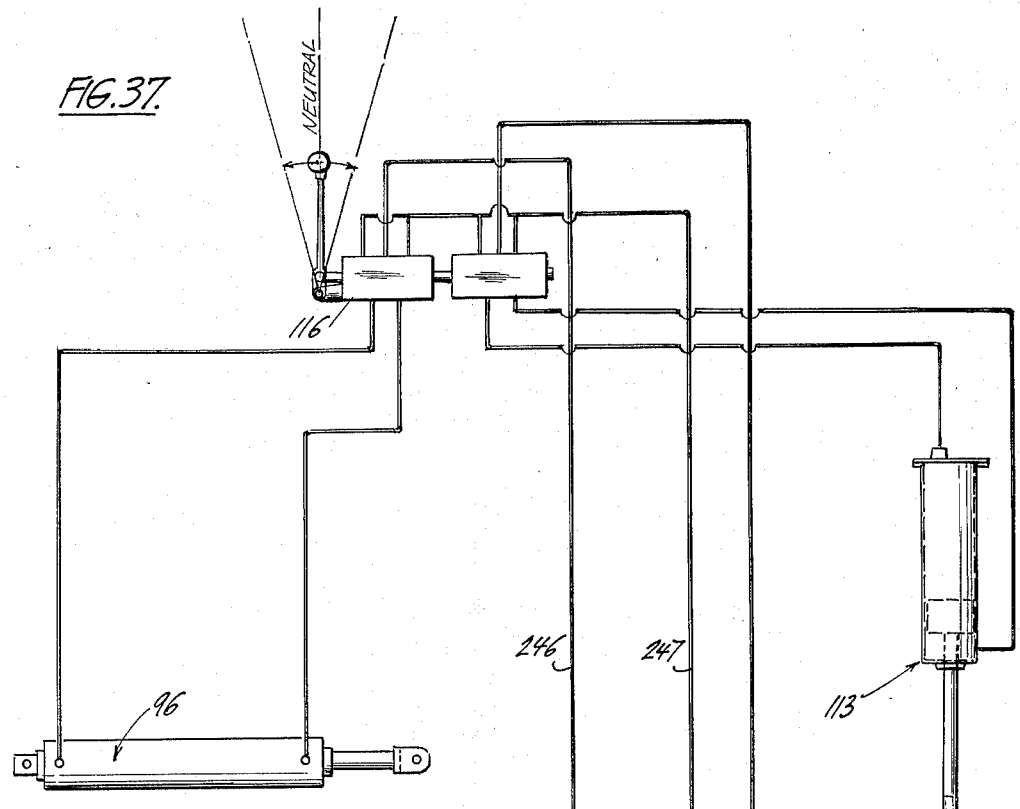
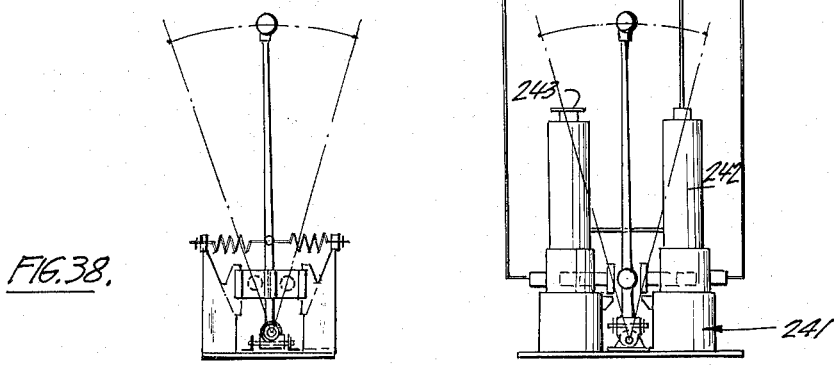
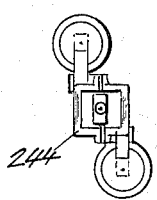
INVENTOR.
BY *Otto V. Drtina*

March 22, 1966 O. V. DRTINA 3,241,511
BOAT HULLS, MOTOR-PROPELLER UNITS AND HYDROFOIL COMBINATIONS
Filed Feb. 20, 1964 17 Sheets-Sheet 17

INVENTOR.
BY Otto V. Drtina

United States Patent Office 3,241,511
Patented Mar. 22, 1966

3,241,511
BOAT HULLS, MOTOR-PROPELLER UNITS AND
HYDROFOIL COMBINATIONS
Otto V. Drtina, Cleveland, Ohio
(1052 Kenneth Drive, Lakewood, Ohio)
Filed Feb. 20, 1964, Ser. No. 347,645
21 Claims. (Cl. 114—66.5)

This is a continuation-in-part of previous applications, Serial No. 117,568 of June 15, 1961, Serial No. 174,599 of April 6, 1962, and Serial No. 243,191 of December 3, 1962, which all were abandoned and substituted by this one.

The main object of this invention is a streamlined, fully enclosed boat hull and a new easily steerable arrangement of a tilting out and back swiveling inboard power unit, flange-mounted in a water-tight manner on a boat's bell-shaped body, rendering a hydroskim effect created by exhaust gases led into said bell space.

Other objects are: An inboard mount with a vertically movable and swiveling propeller tube; revolving outboard propeller unit for regular and hydrofoil operation; a combination of retractable hydrofoil and standard outboard on a common bracket; a resilient mount of hydrofoils; a retractable and resilient combination mount; a freely swiveling mount of hydrofoils; hydrofoils arranged in tandem form; submersible hydrofoils arranged in tandem, step-ladder and stir form; hydraulic lift of hydrofoils with a resilient action; and, a frame as a backbone of the hydrofoil crafts.

Present status: Existing outboard motor-propeller units in L-form (having their vertical drive shaft, called a king shaft, extended down from the crankshaft and the bottom horizontal propeller driving stub shaft set under a right angle to form an L), as used in ordinary means an unbalanced distribution of weight, tending to lift the bow of the boat at full speed, with the result that waves pound onto the bottom, making the ride rough and unsafe.

Existing stern drive units in Z-form (having their horizontal crankshaft extension, the vertical king shaft and the bottom horizontal propeller stub shaft set in the shape of a Z), with a rigidly mounted motor inside of the hull and with the drive shaft going through the transom to drive the propeller part as used in ordinary pleasure boats also means unbalanced distribution of weight, as before, however with somewhat less bow-lifting tendency as the heavy motor is located in the stern part of the hull.

Jet powered units have appeared on the market, too. They are nothing new, and no more than an ordinary motor driven inboard centrifugal pump, sucking water from the front and pushing it out at the stern. This arrangement needs a separate rudder to steer the boat.

There are known outboard motors mounted inboard in a well, where the standard outboard motor is mounted rigidly in a movable ring, concentrically arranged in a stationary vertical cylindrical tube, as can be seen in a typical example of U.S. Coast Guard 22-foot boat CC22104, using standard 75 H.P. nontilting-out outboard motor. The arrangement is however, very difficult to steer, despite its being mounted on ball-bearing rollers. Some power-steering has to be used. Also, if a propeller part should hit an obstacle, serious damage to the mechanism could occur.

Therefore, a number of developments were brought up and described in the following disclosure. In order to be able to explain new features fully and clearly which were indicated above and are described afterward, drawings are attached, where:

FIGURE 1 shows a boat-hull in side elevation with a motor-propeller unit mounted on a bell-shaped body in the center of gravity of the hull.

FIG. 2 is a front view of above.

FIG. 3 is a plan view of above two figures.

FIG. 4 is a perspective view, forming the boat-hull of Delta shape.

FIG. 5 shows a motor-propeller unit in L-form, flange mounted on top of the bell-shaped structure.

FIG. 6 is a plan view of FIG. 5.

FIG. 7 is a bracket to accommodate a motor-propeller unit of FIG. 5 outboard.

FIG. 8 shows the mounting of same on a stern transom.

FIG. 9 shows a motor-propeller unit in Z-form, flange-mounted inboard on the front side of the bell-shaped body.

FIG. 10a shows a Peaucellier straight line motion linkage in general.

FIGS. 10 and 11 show inboard motor-propeller units for hydrofoils with a vertically movable and steerable swiveling propeller tube with an automatic upward escapement, when hitting an obstacle. In FIGS. 11a and b, there is shown an antifriction bearing combination for linear and rotating movements.

FIG. 12a shows a revolving stern drive for hydrofoil and ordinary applications with a longer arm in the water.

FIG. 12b shows the same drive with a shorter arm in the water.

FIG. 13 shows a hydrofoil boat with bow-retractable hydrofoils and the stern hydrofoils attached directly onto a revolving propeller shank.

FIGS. 18 and 18a is another way of retractable and resiliently mounted bow hydrofoils, attached to parallelograms adapted for adjustable tilt and hydraulically operated.

FIG. 19 shows a combination of a stern retractable hydrofoil and tilting out and back and a steerable outboard mount thereon.

FIG. 20 is a stern hydraulic cylinder for a retractable and resilient mount of the hydrofoils with a standard outboard motor-propeller unit thereon.

FIG. 20a shows a freely swiveling wing on the bottom to reduce turbulence.

FIG. 21 is a rear view of FIG. 20.

FIG. 22 is a top view of same.

FIG. 23 is a bow retractable hydrofoil mount on a telescopic hydraulic cylinder with an adjustable tilt and with hydrofoils arranged in stair form on a cylinder piston rod.

FIG. 24 shows the same stair arrangement for the stern and hydraulically operated.

FIG. 25 is a hydrofoil boat in side elevation showing retractable and resilient mounted hydrofoils, using parallelograms.

FIG. 26 is same hydrofoil boat in plan view and

FIGS. 27 and 28 show a hydrofoil boat of FIGS. 25 and 26 in rear and front views.

FIG. 29 is a side elevation of a bow part of a submersible craft with

FIG. 29a showing the hydrofoil in front elevation.

FIG. 30 is a side elevation of a stern part of a submersible craft, incorporating retractable hydrofoils, resilient mount of same and also having an adjustable tilt for submersion and rising ability.

FIG. 31 is a side elevation of a submersible hydrofoil boat, using tandem arrangement.

FIG. 32 is a plan view of same,

FIG. 33 is its front elevation, and

FIG. 34 shows the front shell of the bow hydrofoils arranged in tandem.

FIG. 35 shows a bow hydrofoil unit in step-ladder form for a submersible hydrofoil boat.

FIG. 36 shows stern hydrofoil units in step-ladder form for same.

FIG. 37 is a hydraulic system for bow and stern cylinders to tilt hydrofoils.

FIG. 38 shows a selective hand-actuated device to operate bow or stern cylinders, or both.

FIG. 39 shows same in plan view, and

Figure 40:
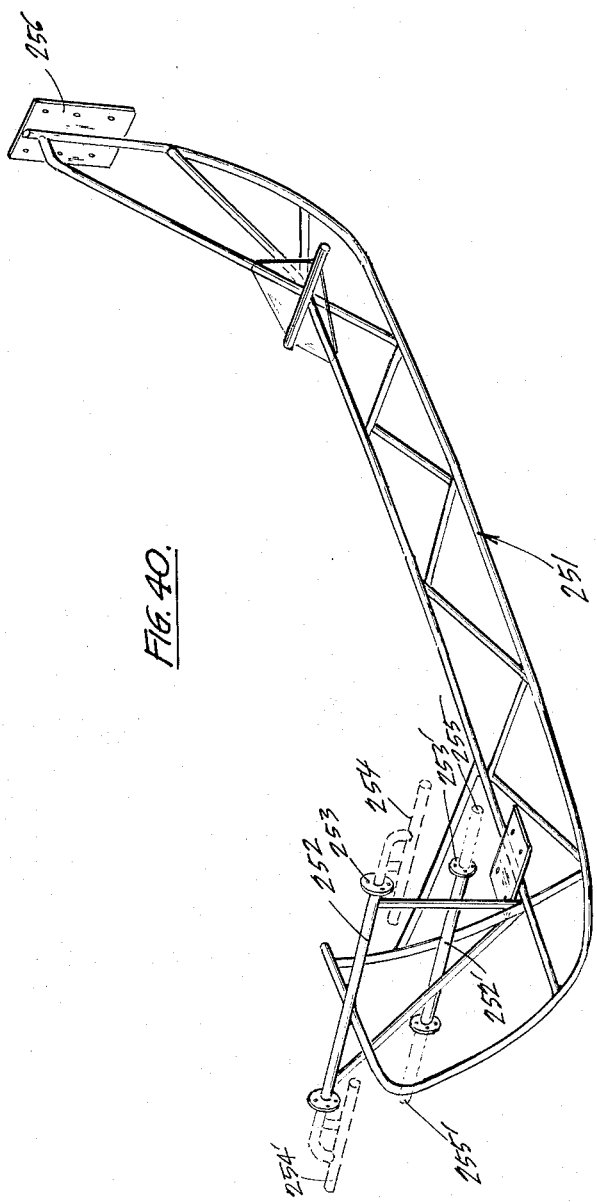

FIG. 40 shows a frame, essential for a successful hydrofoil application.

Boat hulls: In describing various arrangements, the simplest way to fabricate a boat-hull from aluminum sheets is shown in the embodiment of FIG. 4. First, a cylindrical or an oval or a keg-shaped hollow body is fabricated; then the bow is gradually rolled out to flat upright front $c'-d'$ from the amidship portion $a_1b_1c_1d_1$; then stern part is rolled out to the flat rear edge $a'_2-b'_2$ gradually from the center round or oval cross-section $a_1-b_1-c_1-d_1$ under 90° angle into horizontal Delta form. Then the top opening is cut out and provided with transparent plastic, to form a side-swung cover 4, on hinges 4a as shown in FIG. 2, openable from inside and outside through a standard snap latch 4b as is a custom on sport cars or planes. The bottom opening is then cut out and a bell-shaped, elongated piece 2 welded or riveted in as shown in FIGS. 1 and 3. The bow and stern are welded edge-tight also. The gunwales on port side and starboard side are reinforced in the same way with split tubing, slipped over the edge and tacked to.

Hull reinforcing frame: While various motor-propeller units can be well accommodated on strong transom, on a metal bell structure or on an inboard saddle of the hull, it is essential to provide a strong frame to take up stresses from active hydrofoils, which have an inherent drawback to concentrate loads and shocks to three points of the hull only, which points of localized stress are quite difficult to make strong enough to withstand fatigue. The necessary reinforcing frame is, therefore, fully described later on in the section dealing with the suspension of hydrofoils.

Motor-propeller units and their location: The position of the bell-shaped body to accommodate the flange-mounted tilting out and back and revolving inboard motor-propeller unit could be anywhere in the keel (which extends the whole length of the bottom of the boat) from amidship to stern, but to get the boat behavior as close to the existing ones, it should be located closer to the stern, when possible. The bell-shaped structure, which is open to the water side, must be tightly secured to the bottom of the boat so the joint is not only leak-proof, but air-tight, too, to prevent escape of exhaust gases.

In order to be able to take out the motor, the annular mounting flange of the bell-shaped body is made with its opening large enough above the water-line to get the propeller end through, and then a light weight blind flange is to be mounted on for safety reasons.

FIG. 5 is a side elevation of a motor-propeller unit 11, mounted on the top flange 3 of a bell-shaped body and FIG. 6 is a corresponding plan view.

Referring to FIG. 5, the rotating power from the motor is transmitted to the propeller through a down directed extension of a crankshaft, called usually a king shaft, positioned centrally in its housing; further through a pair of bevel gears, one secured on the bottom end of the king shaft and the other on the inner end of a horizontal stub shaft located in the bottom head of the housing 13, and through said horizontal stub shaft, on whose outer end is secured the propeller. The basic and most important part of the mount is the tilting out and back and revolving joint 15, arranged under cylinders, where the combustion takes place, being the main part of the motor: Said joint is housed in a flanged enclosure, enabling the steering of the motor-propeller unit and the back tilt. The motor unit 11 according to the invention has a cylindrical journal 14, machined out in its vertical king shaft housing 12 right below the cylinders. A spherical or cylindrical piece 15 is provided with main upright bore to serve as bearing for the king-shaft housing journal and two horizontal side-pins 15a and b are imbedded in the sphere and in the main flange 16, having a central opening so the king shaft housing can go through and provided with a water-tight inclined enclosure 17, also having a central opening for the same reason. The whole unit is mounted on the top flange 3, of the bell-like structure 2, so the sphere with its journal-bore is free to tilt from vertical to 45° inclination.

As indicated, the exhaust line goes from the cylinder exhaust ports and manifold through the hollow space of the tilting and revolving joint down along the main propeller driving shaft and out into the bell-space through the nozzle 20. When the boat is going full speed ahead, the bell-space is without water as it is filled with exhaust gases preventing, in that manner, the undesirable turbulence and friction losses. This enables the stern part of the craft to skim over the water on a cushion of slightly compressed exhaust gases.

Water cooling line 19 goes from the pump housing 18 of a centrifugal pump arranged right in front of a propeller and up through the tilting and revolving joint passage into the jacket of cylinders to provide an efficient cooling of the motor which, being located inside the hull, should not be annoying in the least manner with emitted heat. The returning warm water from the cylinder jacket, in passing through the tilting and revolving joint, keeps the whole unit assembly warm. This manner prevents the freeze-up of same and the stiffness of motion in the freezing wintertime.

Assembly of the flange-mounted motor-propeller unit of L-form: The sphere 15 with cross-pins is imbedded in flange 16, and a top flanged cover 17 is secured on. This formed portion of the mount is then put on the journal of the king shaft housing with the motor on but stripped off the part 13, including the propeller. In order to be able to steer the motor, the spherical part 15 with its two extension pins of the tilting and revolving joint, mounted on the supporting and sealing flanged body 16, including the enclosure 17, must be so that the journal 14 of the king shaft housing 12 is freely turning in 15; then the bottom housing 13 with the propeller end must be inserted into housing 12 and secured. The joint itself must be swinging freely on its stationary pins 15a and 15b, imbedded in flanged body 16 and 17. The whole motor-propeller assembly is then mounted on flange 3 of the bell-like structure with the motor companion flange 16 bolted on rigidly, so the sphere has its axis crosswise to the keel and the king shaft housing can tilt from vertical to 45° backwards in order to protect the shank from damage when striking an obstacle and to turn in its journal bearing a full 360°, enabling the steering of the whole motor-propeller unit.

Steering: For the purpose of steering the boat, there is provided a rigid bracket 21 on the motor housing and a swinging lever 22a mounted thereon and operated in the usual way. The operator is seated behind the motor on seat 5 attached directly to the bell-like structure 2, so his feet can rest comfortably on rests 6. He does the steering by turning the whole motor-propeller unit, located directly in front of him.

In order to keep the motor-propeller unit properly set for the best operating condition, there is a rigid bracket 21 secured onto the motor housing, resting with its roller assembly 24 (or a gliding shoe) on horizontal annular machined flange 16, secured firmly to flange 3 of the bell-shaped structure 2. This roller is to be arranged on the same side as is the propeller, so a moment produced by its thrust T is taken-up by a reaction force-moment acting from point "o" of said support. To set the propeller unit for its best performance, there is arranged a vertically adjustable runner in bracket assembly 24, attached to the motor housing. It consists of an eccentric shafting 24a on which rolls a runner 24b, and the shaft is secured against rotation through a position-securing screw 24c to the bracket. The runner 24b rolls around the top flange of the bell-like structure as the unit is steered. Said adjustment is needed to properly set the pitch of the propeller. By turning the shaft 24a, the bottom of the motor-propeller assembly is set around point "o" forward or rearward, as necessary. When tilted forward, the working propeller shows a tendency to lift the stern of the boat and when tilted rearward, to pull the stern down.

During the forward movement of the boat, if the motor should strike an obstacle with its propeller, it is, by virtue of this set-up, free to swing back as the bracket with its roller is simply lifted from its base flange, and comes back to its original position after the obstacle is passed through the forward pull of the propeller. It is brought to the reader's attention that for reverse movement of the boat through turning the motor 180° without reversing the propeller rotation, the same bracket roller assembly acts properly to take-up the thrust-moment at any other position just as well.

Operational: The engine can be started by a rope starter or by an electric starter (not shown) depending on how expensive the outfit can be. The engine speed adjustment is also standard.

Back-movement of the boat: The simplest way this can be accomplished is to have the motor running at slow speed and the steering handle 22a turned 180° forward. One more way to move the boat backward is to reverse the rotation of the motor; then the steering arm doesn't have to be put forward at all. Or reverse gear can be built in, too. Both are standard practices anyway, but the latter is more expensive.

Safety: The novel arrangement as described is much safer, as the boat can be fully enclosed by a detachable plastic dome, so minor repairs can be performed in comfort even in rough wheather. The engine being protected from the outside assures better running. With correct distribution of weight, the bow is always at least partly submerged, cutting the oncoming waves to its sides, thus eliminating the pounding of the waves on the bottom of the boat and resulting in a smooth run in rough weather, a feature adding a great deal to safety. An air-tight compartment 7 is provided in the front part and another 7' in the rear, as shown in FIG. 1, making the boat practically unsinkable.

The Delta arrangement of the stern wings (fins) adds to safety, too, preventing the boat from turning over when negotiating sharp curves, as the motor-propeller pushing force tends to tilt the boat slightly, enabling the sliding of the stern to the respective side.

The hull outlined and described in FIG. 1 is one of a streamlined design with transom board fully eliminated. But it should be realized, and it is clearly pointed out, that this new inboard motor-propeller unit can be accommodate in any existing boat-hull just as well. In such a case, a bracket 26 as shown in FIG. 7 may be used which consists of a rigid part 27a clamped to the transom through bolts 29. To this rigid part, a swinging portion 27b is attached through a couple of rivets located at point 28, giving a swinging possibility of about 7½° up or down. For that purpose, radial slots or holes are provided on the sides, into which side bolts 30 are engaged to render both parts rigid, after the positioning is made. The motor with its flange, as described before, is mounted in the top opening and secured to the bracket through six bolts into the bores as shown.

Boats which accommodate motors on the transom, especially those of Fiberglas which can be easily shaped into streamlined form in the stern part, should, for said reason, have the stern provided with a tiny transom only, as shown in FIG. 8, to accommodate this new inboard motor-propeller unit, as described, or a standard outboard motor-propeller unit thereon, and also to have a bell-shaped body, as shown in FIG. 1. In this manner, two motor-propeller units in tandem, one behind the other, could be arranged in two operating levels.

The motor mount, as described, is an ideal way to motorize canoes, as it is well known that the knife edge ended stern is unsuitable for an outboard motor-mount. (It is also well known, that the side mount now practiced, is far from being right.) Canoes, especially freight ones, are fairly wide in the middle and so an arrangement of a bell-shaped structure to accommodate an inboard motor-propeller thereon is, naturally, the best method. The distribution of weight is then ideal and the stability is increased.

Arrangement of a tilting out and back and revolving inboard motor-propeller unit flange-mounted inboard on a bell-shaped body is also advantages to be used on sloops instead of an open well, so water could not enter the boat when the sloop is tilted heavily with sails under a side wind.

The otherwise standard 2-cycle motor can be equipped also with a dual-duty gas injection, as described in separate patent application Serial No. 160,407 of December 13, 1961, for trolling at very slow speed, say, way under 500 r.p.m. The motor, which otherwise is running on a 2-cycle principle, will be manually shifted, in such a case, to a 4-cycle run, rendering a sputter-free slow speed without any further need of a speed-reducing gear.

In FIG. 9 there is shown an arrangement with standard stern drive unit 36–37 of Z-form, mounted in the front side of an air-tight bell-shaped body 38 which, for that purpose, is provided with upward inclined flanged mount, under the same angle that present transoms have, centered in a vertical plane along the keel with a necessary opening for the through going drive shaft and universal joint to drive the propeller unit, located in the bell-structure. The entire motor-propeller unit is set in the boat's center of gravity with the exhaust line leading from the engine into the bell-shaped space. This way we get at the full speed of the boat, a hydroskim effect so the boat can slide on a cushion of gas while being propelled with said unit. The whole stern propeller assembly is tiltable in the regular way, as shown. The motor 36 can be arranged a little more forward than usual, so more space is gained for access to rotary seals in the bell's flanged mount 39 and to the motor as well.

The steering is practically standard as used on stern drives, going through the mounting flange 39 wherein a universal joint for steering is located; remaining linkage 41 is made to suit the operator sitting on a seat attached to the bell-shaped structure, as described before. On top of the bell-shaped structure there is provided an opening, covered with a lid 40 for the access to the stern drive unit so it may be taken out when necessary. In order to improve steering of the boat, a small fin is arranged in front, so the bow keeps the course when negotiating curves.

In operation, the propeller provides forward movement of the hull and the exhaust, filling out the bell-space, lifts the boat somewhat and enables gliding of the hull on a cushion of gases at much faster speeds.

A fully water-tight inboard motor-propeller unit comprising a revolving, vertically movable, telescopic propeller tube 44a, as shown in FIG. 10, is well suited for hydrofoil boats where the propeller can assume three positions:

(I) Fully hidden in the bell in case of moving submerged in dangerous areas or gliding on the surface of very shallow waters, where hydrofoils would be retracted up.

(II) For normal operation, gliding on water-surface.

(III) For hydrofoil operation above water-level.

Among various guide-means of the telescopic and turning propeller tube and movable up and down in vertical straight line, rendering free movement without binding, the best suitable for hydrofoil applications are:

Peaucellier linear motion linkage described fully in "Product Engineering" of June 24, 1963, page 105 and Linear antifriction bearing combined with radial antifriction bearing, made by Thompson Industries; all standard sizes are readily available.

It is, however, pointed out that to make the long telescopic tube movable in a straight line, two sets of linkage spaced apart, not to touch each other, or two bearing-units acting as guides on said telescopic tube and reasonably spaced apart to prevent binding, are needed. Besides, one of each kind can be used, for instance a Thomson bearing placed in a bell-shaped structure and a single Peaucellier linkage, arranged above.

Peaucellier linkage, in general, as indicated in FIG. 10a is to produce straight line motion and consists of a parallelogram having all four sides the same length and which ends are jointed; a diagonal center-line going through two joints, and one of those two joints is connected to a stationary pivot located on the same centerline by a connecting rod of a certain length. The other stationary pivot to carry the linkage is on the same center-line, the same distance apart from the former stationary pivot as is the length of the connecting rod and located further out from the parallelogram, and to this stationary pivot are connected the outer parallelogram-joints by two longer connecting rods of equal length; the remaining joint is moving, then, in a straight line, when the whole unit is oscillating like a pendulum around the two stationary pivots symmetrically to the above mentioned center-line.

Describing the unit having its propeller tube suspended on Peaucellier linkage and with stationary motor 36: Said unit consists of a small bell-structure 2, open to the water side and attached tightly to the bottom of the hull, located approximately in the stern part near the center of gravity of the boat and large enough to accommodate the propeller with its anticavitation plate, enabling a turning possibility of same therein. Rigid frame work 43 is secured inside to the boat's hull, as shown, and in its lower front part there is a saddle to accommodate an inboard stationary motor 36.

The vertically movable propeller tube 44a, is rotatably mounted in two sleeve bearings 47a, of the Peaucellier straight line motion mechanism 47 arranged, in a couple as a parallelogram, each unit having its two stationary pivots (fulcrums) under 90° with the propeller tube 44a, and located in a forward directed radial plane from same; said fulcrums attached to the upper portion of frame 43. The up and down movable ends in a straight line are each hooked to the horizontal cross-pins of a sleeve 47a in which the tube 44a can freely rotate but is axially fixed to said sleeves; this telescopic tube can also move freely through the antifriction linear and revolving bearing with the integral seal ring of the bell's flanged mount 48 in limits between I to III.

The vertical position of the tube is actuated through a hand crank and screw in nut 45, acting on rear lever 47b of Peaucellier linkage, to enable all three said positions I, II and III, with the possibility for the tube 44a to be pushed up by a safety device 46, which will be described later.

The king shaft 36d imbedded rotatably in tube 44a is driven from the motor through its extension shaft 36a of a motor crankshaft, a pair of miter gears, vertical shaft 36b and a chain drive 36c. In the bottom head of the telescopic tube there is provided a drive to propeller 36g, through double miter gears 36f arranged in the propeller housing, having one adjoining pair rigid on the vertical and horizontal shaft, the other pair free-moving. In this way the torque transmitted to the propeller, divided two ways, produces no force tending to move the propeller tube, resulting in easy steering movement. The unit steering wheel 49 is fixed to the top of the propeller tube and can be connected through flexible cables to the boat's main steering wheel (not shown).

Safety guard rod (or bar) 46 is attached with one end to the propeller housing through a universal joint located in the centerline of the telescopic tube on the very bottom of the propeller housing and the other end set in front in a sliding manner in a guide-groove along the keel. When the rod is in position I, it is horizontal and almost hidden in the hull; for positions II and III it is inclined. When one of the two remaining locations II and III is set through the crank 45, and power applied to the propeller and when the boat is moving forward and an obstacle is hit by the inclined guard 46, it brings up the whole propeller tube assembly readily and afterwards resumes again the previous location automatically, by its own weight. The steering possibility of this unit is a full 360° around the vertical axis of the propeller tube.

The telescopic propeller tube mounted on Thomson antifriction bearings, as noted before is shown in FIG. 11. It is much simpler because only a couple of combined Thomson antifriction linear and radial rotating bearings, properly sealed from the water side are used, and having the motor unit attached directly onto the top of the bottom portion of the telescopic tube, the drive is made the shortest way from the vertical motor output shaft through a V-belt and sheaves direct to the king shaft and, therefore, is well suitable for smaller size units.

In describing same, the telescopic propeller tube 44a, which is to be made easily movable up and down and rotating around its axis, is to be mounted in two combined Thomson linear and radial ball bearing units 48, of FIG. 11a and b, spaced apart as much as possible. For that reason one bearing is located in a flanged mount on top of the bell-shaped structure 2 and the other on the ceiling of the boat's hull to guide the extension of the main propeller tube.

The combination bearing, as noted above, consists of a standard Thomson bushing 48a designed for linear antifriction movement, with an ordinary radial ball bearing 48b secured to its outer body, and the whole assembly is set in a flanged body 48d and enclosed. In the bottom part of said flanged body is arranged a seal ring 48c to prevent water from entering the bearings. The whole unit is mounted on the top flange of the bell-shaped structure 2 of the hull.

In order to be able to drive the king shaft, which is located rotatably inside of the telescopic tube, the tube itself is disconnected approximately in the middle of the hull's space, the tubes put apart just to accommodate a driving sheave secured onto the top end of king shaft 36d. Both ends of the tube are united with a strong bracket in C-shape, which serves also as a motor-mounting bracket, and has a horizontal bore to accommodate a steering lever 49 suspended on the outer end from the ceiling to keep the steering handle approximately the same height for the full range of the telescopic movement.

As noted before, there is needed a mechanism to move the tube into the previously mentioned locations with a possibility of being pushed further up into a hidden position by a safety device 46, and allowed to go down by its own weight to its previously set position. The tube relocation from III to I is performed with scissor-shaped linkage 45, having two cross-bars pivoted in the center, with one set of the outer ends having swiveling nuts and a screw mechanism to move the ends together or outwards through a crank or handwheel; the bottom ones of the other bifurcated ends secured to the flanged body in 48d, the top ends to a collar freely movable on the outer diameter of the telescopic tube. This collar as it is forced upwards through the crank 45, lifts the whole propeller tube assembly as it is pushing up the C-bracket.

The bottom cast housing with the propeller mounted on the horizontal stub shaft and with the anticavitation plate is firmly attached to the bottom end of the telescopic tube 44a. The cast housing should have a ball on the lowest point arranged in the centerline of the tube to accommodate a universal joint of a safety bar 46, to lift the whole telescopic unit when an obstacle is hit, and to let the unit go down, by gravity, into the previous position after the obstacle is passed. This mechanism was already described fully above with FIG. 10.

The two arrangements with the telescopic propeller tube as described above and shown in FIGS. 10 and 11, are ideal when operating in marsh and swampy land. They can be used with hydrofoils as disclosed with FIGS. 23–24 and also FIGS 29–30.

FIGS. 12a and 12b show a stern mounted motor-propeller unit of a Z-form, having its propeller portion 52 equipped with two propellers, arranged on a revolver. The propeller portion is mounted on transom mounting plate 256, integral with the frame and slightly inclined from vertical, as is normally practiced, to fit the standard transom of the hull; said revolving propeller portion is provided with two opposite shanks mounted on the swiveling end of a body, revolving with its integral journal in a revolver bearing, positioned in an opening of said reinforced transom, which bearing is concentrical with the crankshaft-extension of the motor 36, set in front of the transom in the saddle of the bifurcated frame 251. The shorter one, shank 52a, is for normal boating and the longer one, 52b is for hydrofoil operation. (Hydrofoils are to be mounted in this case on the frame of the boat's hull.)

In said swiveling end of the revolving body is rotatably arranged a short horizontal swiveling shaft, connected to the horizontal crankshaft-extension by a universal joint, located at the point of intersection of the crankshaft-extension going through the revolver and the upright axis of the swiveling end of the revolving body.

The shorter shank is made tilting out and back around pivot "o" of the swiveling end of the revolving body and is having its propeller driven from the swiveling shaft through the bevel gearing positioned at "o," wherein one gear is on the swiveling shaft and the other on the upright king shaft, set rotatably in the shank, to transmit rotation over two universal joints (to enable tilting of this shank) and through another bevel gearing to drive the horizontal stub shaft, positioned in the propeller housing, on which shaft is mounted the propeller.

The longer shank is integral with said swiveling end of a revolving body and has its propeller driven from said swiveling shaft through the bevel gearing located at point "o," through a king shaft rotatably set in the longer shank and another bevel gearing set in the propeller housing to transmit rotation to the horizontal stub shaft of the propeller. (The longer shank is non-tilting because it is supposed to operate in open water, but it could be made tilting out and back too, when required.)

Revolving mechanism: Both shanks arranged on the swiveling end of the revolving body are made to revolve 360° around the horizontal axis parallel with the keel by means of an integral journal of the above revolver body, turning in the revolver bearing secured to the transom; said bored journal is provided on the inboard end with a sprocket and chain drive 53a and actuated by a hand crank 53 set on the extended shafting so it could be reached by the operator, to affect the revolving. A locking device is provided with a pin arranged on to the frame pivoted lever, so the pin can be engaged and disengaged from 180° apart bores in the sprocket to keep one at the time of two opposite positions; the long shank straight down to be immersed, or the short shank directed down into the water. The lock releasing mechanism 50, for instance, through a rope to pull the spring-loaded locking pin out of the bore of the above said sprocket is seen in both FIGS. 12a and 12b.

The steering mechanism: Both shanks are made swiveling in unison the regular way around the upright axis A of the swiveling end of said revolving body; each element having integral bearings set along said axis and pivotally joined through a king pin to form a hinge, to enable the swiveling; the steering mechanism comprises a bevel gearing set centrally with the above said universal joint located at the point of intersection of the horizontal crankshaft extension going through the sleeve of a revolver, and the upright axis A of the swiveling end and the revolving body; one bevel gear is secured to the upright shaft A to swivel the shanks, the other is mounted on a sleeve going through the bored journal of the revolving body, having inboard on said sleeve a sprocket and chain drive 51a, actuated from the steering wheel.

The steering is provided from the steering wheel (not shown) through actuating sheave 51 arranged on a long sleeve and through a chain drive 51a and a sleeve going through the revolver of the stern mounting flange and over a pair of bevel gears to actuate the vertical shaft around centerline A, which is turning in either direction the upright swiveling assembly, to steer the propeller units.

Operation: The changeover from one poistion to the other is best done when the motor is idling. First, the lock is to be released; then through the crank, a revolver is turned 180° and locked; then the speed is resumed. Said revolver unit can also be protected against all kinds of freely floating obstacles through the mechanism as indicated in FIG. 12a. When docking the boat, the longer shank is swung out into a horizontal position so that it will not be in the way.

Motor propeller units heretofore shown and described use mechanical means to transmit power from the motor to the propeller. However, other means are just as suitable as, for instance, a gas turbine for the prime mover; and a centrifugal pump instead of the propeller. Hydrodynamic drives can be used, too, on motor-propeller units with the pump driven from the engine, and a hydraulic motor on the propeller side interconnected through piping and actuated by a 4-way valve. Also, pneumatic drives using the internal combustion engine as gasifier to produce hi-pressure exhaust gases are possible, while the reversible turbine hooked onto said pneu-system drives the propeller. Even other sources of power than the internal combustion engine can be used, such as are fuel cells with electric motors.

Hydrofoils:

FIG. 13 shows an application of the before described revolver to a hydrofoil boat, where the bow hydrofoil is retractable and the stern hydrofoil is attached directly to the longer shank.

A retractable bow hydrofoil 49, in unit with a couple of holder-shanks is mounted in a sliding manner in a couple of rectangular vertically arranged sleeves and operated up and down by means of, as in the instance shown, a right angle lever and connecting rod.

The stern hydrofoil assembly 54 is mounted directly on the longer shank 52 of the stern drive, taking the place of an anticavitation plate and having a swallow-tail fin 55 for that purpose.

In operation, the changeover for hydrofoils has to be done when the boat is out of bay on the open water: While the motor is idling, the rear unit is revolved and the front hydrofoils are lowered down. As speed is resumed, the boat will lift itself shortly after attaining about 20 knots. The steering is done through swiveling of the stern shank around vertical axis A in the standard manner as previously described. On reutrn, when nearing the dock, the speed has to be cut down and the unit revolved with the hydrofoil up and the bow hydrofoil up also. This way, nothing stands in the way of easy docking as standard boats do, and the hydrofoil boat can be pulled out of the water just as easily, with the hydrofoils out of the way, as the ordinary boat.

Hydrofoils in general and their behavior: When investigating in principle the action of an ordinary water-ski it is found that it has very poor lift/drag ratio as only the front curved part affects the lifting and the horizontal rest produces drag only. With a pitched-down water-ski, things are improved a bit, but the remaining drag is a considerable factor.

Hydrodynamic tests conducted by U.S. Government laboratories and some large companies show clearly that properly pitched hydrofoil gliding planes, of wing shape, mounted on a vertical streamlined shank, render best efficiency. There is a definite limit to which hydrofoils can extend, as applies to wings on aeroplanes, as fluid, like water, has much better lifting capacity than air, and besides pounding waves produce much harder strain on said wings.

Therefore, resilient means to mount hydrofoils on are developed and are described later on.

Concerning the size of hydrofoils, there are formulas developed from practical tests for the necessary plane-area for a given pitch, weight and speed. (Reference: Grumman Aircraft Co., Study of Hydrofoil Crafts, vols. I and II.) But it is recommended that one should test individually each new shape on especially constructed testing stands, to find the lift/drag ratio and best efficiency.

Fast hydrofoil boats must have good maneuverability; this is especially important for submarines and racing boats. Therefore, means are described in the following, enabling stern hydrofoils to swivel like casters in the direction of flow in order to produce least drag.

The gliding planes of hydrofoils behave similarly to the wings on aeroplanes with the exception that only those submerged and those that are surface-piercing have a lifting ability, as those above the water are rendered inactive. This feature has a unique characteristic of self-adjustment to the surface of the water in relation to speed and is utilized to the best advantage in a combination of surface piercing and submerged hydrofoils arranged in stair and step-ladder form, as will be described later on.

Figure 14:
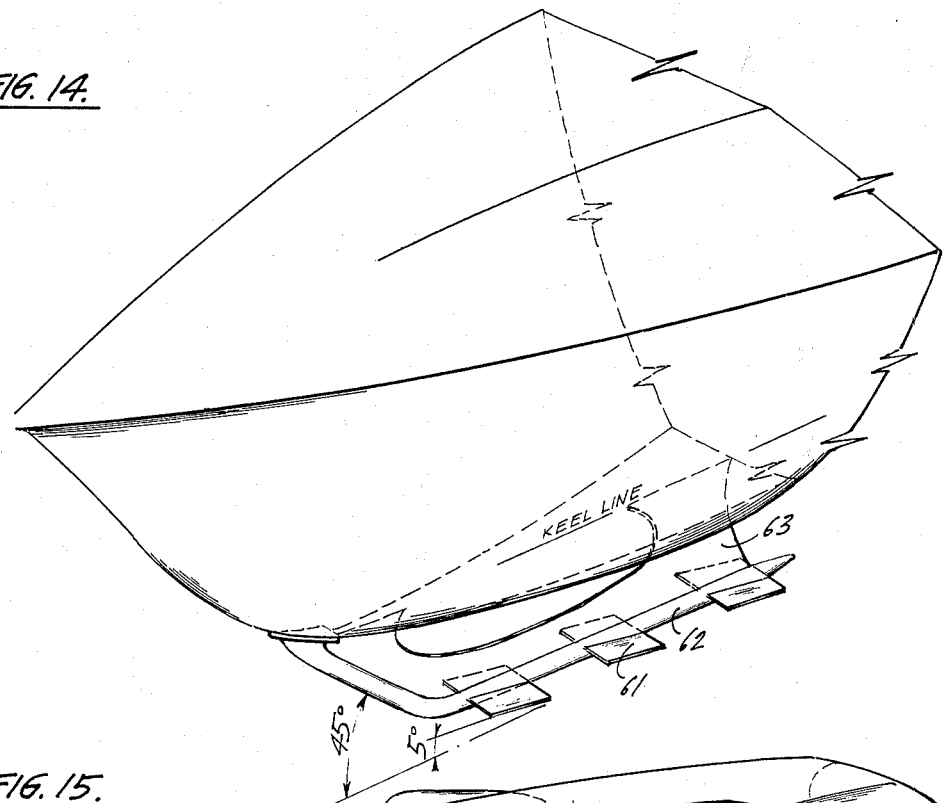
FIG. 14 shows an arrangement of rigid bow hydrofoils in tandem.
Figure 15:
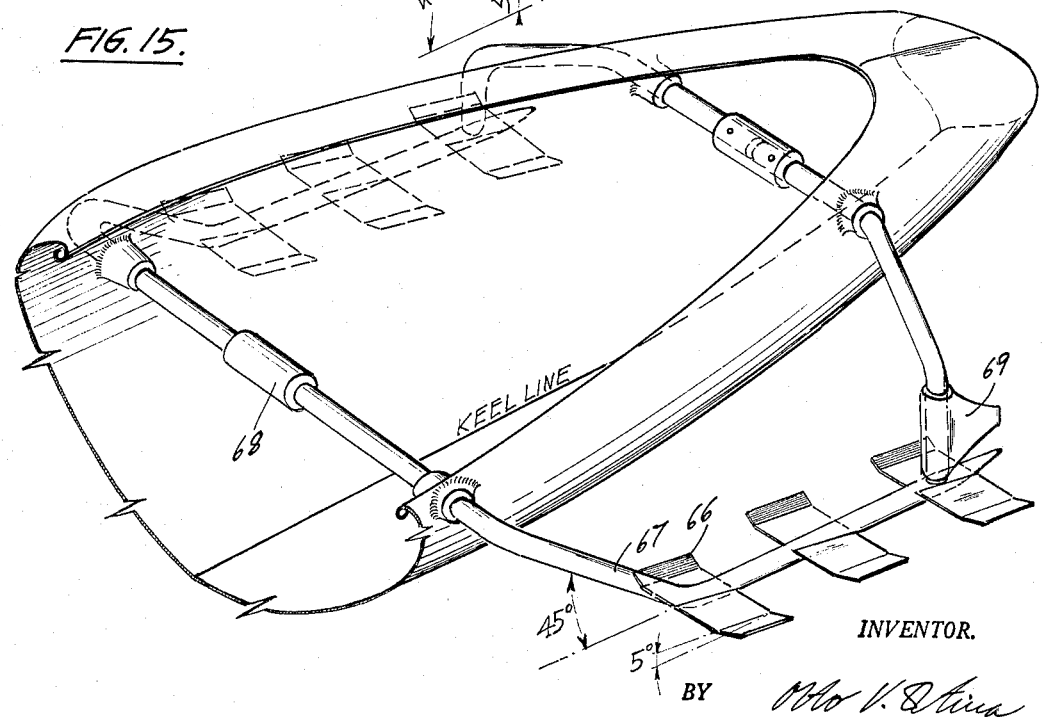
FIG. 15 shows an arrangement of rigid stern hydrofoils in tandem.

Multiples of hydrofoil gliding planes arranged in tandem are advantageous in transforming a long hydrofoil area of ski-form into several smaller areas, and provided with proper pitch as shown in FIGS. 14 and 15; in this way, the shocks of pounding waves are confined to comparatively narrow width and planes, positioned one behind the other in the line of flow. Therefore, there is much reduced pounding. This shape arrangement will work smoothly in rough sea and is suitable for fast freight hydrofoil boats carrying heavy loads.

FIG. 14 shows a bow section, where to a keel is attached a rigid frame having a horizontal, through vertical fin 63, reinforced tube 62 distanced properly from the hull into the water and parallel with the keel, where its integral tubular bow part is slanted 45° to 60° for the purpose of gliding freely over floating obstacles. Onto the top part of tube 62 are secured hydrofoil gliding planes 61 to be protected against injury, one behind the other and pitched up forward as shown.

FIG. 15 is a stern section of a boat where two sets of hydrofoils are attached to the boat hull through a tubular framework 67, coupled together through couplings 68. There are needed at least one unit as shown in FIG. 14 and two of FIG. 15 arranged sideways on the hull to form a 3-point suspension for keeping needed stability.

A very important safety feature of modern hydrofoils is protection against floating objects in the water. This is accomplished by a slanted front reinforcing tube 62 as shown in FIG. 14, to prevent destruction of hydrofoils in case a floating plank or log should be hit. In such a case the back inclined strong hydrofoil holding member at about 45° simply glides over the instant obstacle; sic, protecting the thin hydrofoil plates arranged behind. The same feature is recommended to be provided for stern hydrofoils also, as shown in FIG. 15. There, to the front extended and up-inclined tube 67, does the job in protecting the sensitive hydrofoils arranged behind, in a very positive way.

Resilient mount of hydrofoils: As it was mentioned before, this absorbs shocks and pounding and relieves strain on the hull; it is advisable to use it wherever possible.

Figure 16:
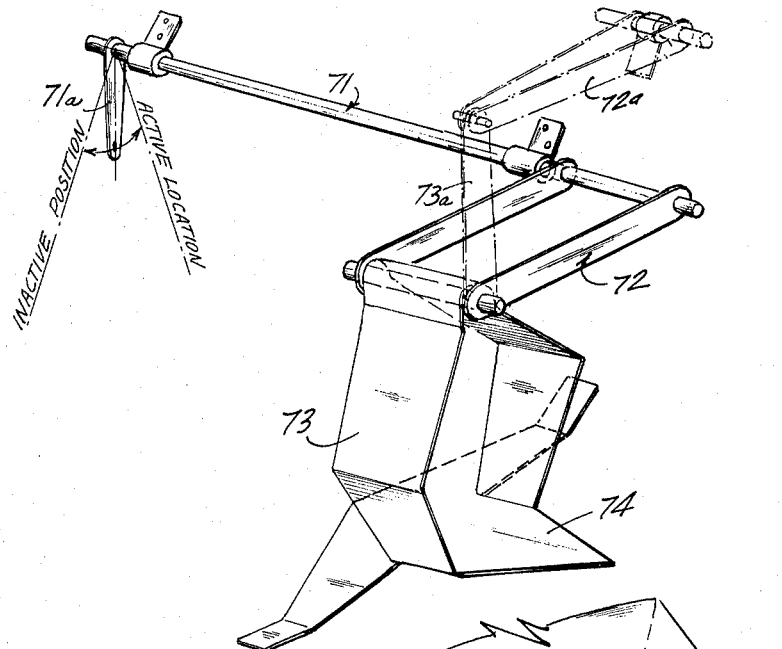
FIG. 16 shows a retractable and resiliently mounted stern diamond-shaped hydrofoil on a torsion rod.

FIG. 16 shows a resilient mount of stern hydrofoils using torsional rods, which are arranged on each side of the boat symmetrically; each torsional rod 71 is placed parallel with the keel (see applications in FIGS. 31, 32, 33 and 34 and also in FIG. 36) and is provided on the rear end with out-extended double-arm 72, so the whole forms a rigid crank; the front end of the torsional rod is in a bearing secured onto the hull, while the rear end of the torsional rod goes out of the hull through a bearing set in the hull's side. The front end lever 71a is to be firmly held in position on the torsional rod and the swinging end of 71a to be secured on the hull. On each outer end of arms 72, there is mounted a diamond-shaped hydrofoil, directed to the water-level in line of flow, consisting of the bottom gliding horizontal wing 74, welded to diagonal struts 73, in front of same. This feature allows the side-movement of the boat's stern when negotiating curves.

In order to be able to keep the hydrofoil unit in a vertical position all of the time, the above noted resilient suspension through said torsional rod can also be made to act on the parallelogram linkage, having an up-extended arm 73a of strut 73 to be hooked on the swinging end of the second lever 72a of a parallelogram having its fulcrum attached to the hull above the arm 72.

Figure 17:
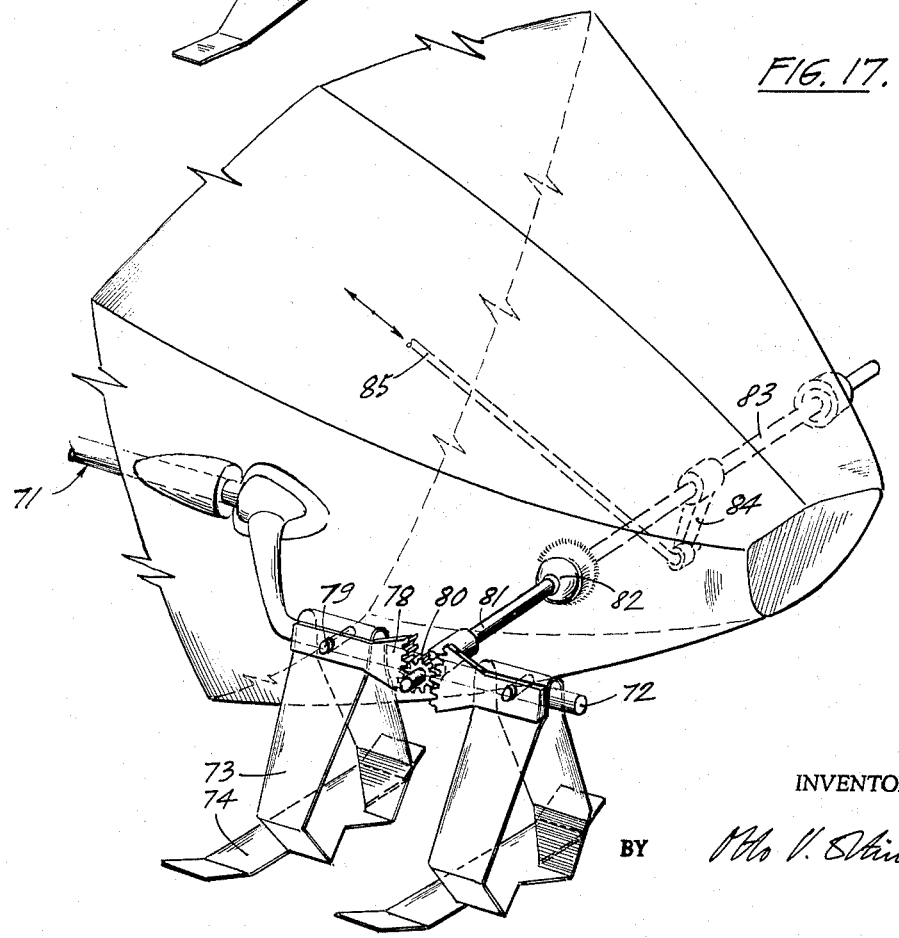
FIG. 17 shows a couple of stern hydrofoils, resiliently mounted on a torsional rod and pitch-adjustable.

In FIG. 17 is shown another arrangement of stern hydrofoils of a diagonal shape, arranged in double on each side of an arm 72 of a torsional rod 71 and made of adjustable pitch through a pinion 80, which is actuated through rod 85, lever 84 and stern cross-shaft 83 over a universal joint 82 and extended out shaft 81. Said pinion imbedded in bearing of 72 is meshed into two segments 78, 78', secured to the hydrofoils which are made tiltable around pins 79, 79'. It is noted that this set-up has opposite moments from the water-resistance acting on each segment, which produces a reduced strain on the acutation mechanism.

Retractable hydrofoils: They are needed to navigate hydrofoil boats in shallow waters, especially when docking. In case the retractable means of hydrofoils are combined with resilient mounts, there always should be used an arrangement where the resilient means are made to transmit the retraction movement.

FIG. 16 shows a retractable resilient arrangement of hydrofoils mounted on arm 72 of a torsional rod 71, which can be retracted through the front lever 71a from an inactive position to active, and vice versa. This retraction-actuating lever 71a is secured to the front end of the torsional rod and has two positions: retracted up and retracted down, which retracting movements are transmitted resiliently to the hydrofoils through the above-mentioned torsional rod, and said actuating lever of each unit is then fixed to the frame to hold the hydrofoils in set position.

FIG. 18 shows a retractable mount of a couple of bow hydrofoils 91. There are two cross-shafts 93 and 93a, one above the other and extending through the hull. On each outer end of the shaft are secured parallelograms 92 arranged lengthwise, engaging thin streamlined slat shanks of each hydrofoil 91. Inside of the hull a lever 94 is provided on one horizontal cross shaft 93 to move the hydrofoils up and down through resilient unit 98 from the operating lever 97, actuated through hydraulic cylinder 96. (This resilient unit 98 is of the same principle as the 138 described in FIG. 25.)

The V-shaped multiple deck hydrofoil gliding planes as shown in FIG. 18 and FIG. 28, described later, have a step-less self regulating ability, because of their characteristic that the deeper the hydrofoils go, the more area is submerged; also, the more submerged, the larger lifting capacity for a given speed the hydrofoil has. For the best performance and smooth run, the V-shaped multiple deck hydrofoil gliding planes ought to be designed so that the point of V and the outer tips of the adjoining lower V-shaped hydrofoil plane are in the same horizontal line, as indicated in FIG. 18.

When computing the area for a given speed, pitch and weight to be lifted, the final area would be made approximately 25% larger so the hydrofoils would normally be ¾ of their total area submerged and the rest, ¼ of the total area size, would be above water. Then in operation, slightly excessive speed would tend to lift the hydrofoil and also somewhat lower speed would cause the whole area of the top hydrofoil to submerge with only the outer tips piercing the surface. There should be a r.p.m. indicator available and some chart for motor speeds according to payload for guiding the operator to obtain best performances and smoothest run.

Referring still to FIG. 18, to be able to make some minor adjustments on the pitch of the hydrofoils, there are the top levers 92 fabricated in two parts, made adjustable lengthwise and secured with two bolts in corresponding slots. Another possibility is to arrange the top cross-shaft 93 mounted in discs secured to hull-sides through set screws as indicated in FIG. 18a, discs having bearings for the shaft set eccentrically. By turning those discs to the same angle on both sides with help of a simple position indicator, one may displace the cross-shaft and so change the inclination of the shank holding the hydrofoil gliding planes.

FIG. 19 shows a combination of a standard steerable and tilting out and back outboard motor-propeller unit and hydrofoil, mounted on a common retractable stern mounted outboard bracket.

A rectangular frame 104 fabricated from structural angles and provided with mounting side-plates is rigidly mounted through bolts 105 to the stern transom from the outside. This stern transom is reinforced by the transom mounting plate 256, integral with the frame 251. In between the upright angles of above said rectangular frame is arranged in a sliding manner, a combination holder 102 of hydrofoils and the motor-propeller unit. The holder is provided with a nut, into which is engaged a screw and crank mechanism 106, mounted in the frame, axially secured while turning, and the crank 107 arranged so that it can be reached from inboard. This retracting mechanism can be arranged in single or in duplicate as shown, and interconnected by a roller chain for nonbinding movement of holder 102 up and down in said frame 104. Turning of the crank 107 causes the holder to move up and down. It is comprised of an out-extending integral upright mounting angle with a standard motor-propeller unit 103 of L-form attached thereon, in a regular way as is presently practiced through two transom C-clamp bolts to enable said motor-propeller unit to swivel for steering, and to tilt out when the propeller end hits an obstacle, and to come back automatically afterwards.

Also, a sheet metal fabricated hydrofoil holding body in a streamlined diamond form is firmly attached to said sliding holder 102 and extended down to the water level to hold firmly on its bottom part a hydrofoil gliding plane 101 in such a way that when the holder is retracted up or down, the forward pitch of the hydrofoil gliding plane remains unchanged all the retractable way. It is noted that the anticavitation plate of the motor-propeller unit and the hydrofoil gliding plate are in the same horizontal plane. The retracting movement of the hydrofoil plane down is to be made to such an extent so as to enable the boat to lift itself at least 2 feet above water level when gliding on its hydrofoils. With the hydrofoil moving up and down, the motor-propeller unit always moves therewith. This feature is also important when using standard trucks for loading and unloading the boat the same way as it is practiced today, where the hydrofoils, just as the motor-propeller unit, are put out of the way when taking the boat in and out of the water.

FIGS. 20, 21 and 22 show a similar retractable combination of hydrofoils with a standard outboard motor-propeller unit having hydraulic retraction. The rigid bracket 111 is mounted on the outer side of the transom and has two bearings arranged along vertical axis, in which a hydraulic cylinder 113 can move up and down. The piston rod is stationary and secured to an up-extended holder of the same bracket. On cylinder 113 there is mounted rigidly an L-shaped motor bracket 112 to accommodate a standard outboard motor-propeller unit 103 through the usual C-clamp bolts in a swiveling and tilting out and back manner. The lower end of the cylinder is extended far down for the purpose of attaching it in a proper position to the hydrofoil 114, as seen in FIGS. 20 and 21, so the top one plane will be level with the anticavitation plate of the motor-propeller unit.

In order to operate the assembly up and down, a hydraulic pump 115 is used, connected to the main cylinder through a 4-way valve 116 and piping 118. When the 4-way valve is in one position, the cylinder goes down in unison with the motor-propeller unit and with the hydrofoils; in the other position of 116, the whole unit goes up when the pump is operated. This arrangement is quite compact and the bottom part of the cylinder extending into the water can be made very strong and streamlined as indicated in FIG. 21. Said hydraulic system is made to work in the range between the inoperative to the active location of the hydrofoils and vice versa.

Resilient attachments 211 for hydraulic cylinders to retract the hydrofoils up and down can also be used, to render the hydraulic system to be working in an elastic way. It is sufficient to provide resilient means in the form of a shock-absorber on one side of the pressure piping only, which pushes the hydrofoils down to lessen shocks coming from gliding hydrofoils, as for instance, shown in FIG. 20. Then an additional cylinder 212 which, preferably, has the same diameter as the master cylinder but having a shorter stroke, is inserted into the pressure piping 118 through connection 215. It accommodates a piston 213 which is spring loaded from the opposite side of connecting piping 215 and closed by a lid. The size of the spring corresponds to the weight to be lifted and for effective resiliency there should be provided a sufficient length of spring which actually absorbs the shocks from pounding waves. The spring side of this resilient cylinder is to be drained through piping 216 to oil reservoir 117 to take care of eventual leaks. For retraction of hydrofoils up, no resiliency is needed. This resilient attachment, as described above, is adaptable to bow and stern hydraulic cylinders and it makes no difference in what position said resilient unit is arranged.

Multiples of hydrofoil planes arranged in stair-form as shown in FIGS. 23 and 24 have similar advantages as hydrofoils in tandem, as only their very modest width of the few surface-piercing hydrofoils are exposed to pounding waves. The rest of the submerged hydrofoils penetrate water smoothly, thus rendering over all a much quieter run, even in rough sea. As mentioned before, they are self-depth adjusting, according to speed.

In FIG. 23, there is a bow hydrofoil arrangement mounted on a telescopic hydraulic cylinder 122, on which the last piston rod 123 of three are secured, the hydrofoil gliding planes 121 in a stair configuration.

The telescopic hydraulic cylinder is arranged inclinably in a vertical plane set along the keel and mounted on a hinge secured to the top bow end of the boat frame and made tiltable from inside of the boat through lever-actuating means as shown. Cylinder 122 mounted in a way so as to hang down on the front part of the hinge which has a horizontal crosswise set pivot as correlated to the keel, to enable a tilt of the cylinder from 60° to 45° from horizontal. Said tilt of the cylinder in range of 15° imparts to the hydrofoil gliding planes a pitch of at most 7½° up and 7½° down from the level, which is sufficient for submersible operation.

The hydrofoil gliding planes 121 are arranged (as regards to flow) behind the farthest out extended piston rod 123 so the boat can jump over freely floating obstacles when struck, without endangering the hydrofoils.

The stair-formed hydrofoil gliding planes have a peculiar action of their own to adjust the position of the hull in regard to water level according to speed, so there is one surface-piercing plane engaging the waves, while most of them remain submerged. To explain it fully, each plane has a certain lifting capacity; in case we have five planes of such a total area that four of them lift the boat at cruising speed, then the fourth one is surface-piercing and the other three are submerged. The fifth one, above water, is inactive. When the speed is maintained, this equilibrium stays without any need for expensive sensors, resulting in smooth run even in choppy sea.

It is possible to set up an arrangement of stair hydrofoils with as few as two planes, where the smaller one is surface-piercing and the other larger one is submerged. A three-hydrofoil arrangement as shown in FIG. 23 would have one surface piercing, two submerged and no inactive plane (or one submerged and one inactive, besides the one surface piercing). A four-hydrofoil setup would, again, have one surface piercing plane, two submerged and one above the water as inactive. All the above is considered at rated cruising speed and gliding on hydrofoils. When the boat speed is over the cruising speed, then the next one submerged hydrofoil plane rises up to level. When the boat speed is under the cruising speed, the submerged planes lose their lifting capacity and the boat starts to drop a step until the fourth plane becomes surface piercing and the three underwater planes will act as submerged.

FIG. 24 shows stern hydrofoils 126 in stair-form mounted on tube 128 in the form of an inverted U and operated hydraulically through cylinder 130 and parallelogram linkage in compact form arranged all inboard as shown. Partial tilt of the hydrofoils is possible through flanged mount of 128 on vertical bars 127.

A hydrofoil pleasure boat with retractable hydrofoils resiliently mounted through spring mounted cylinders is shown in principle in FIGS. 25, 26, 27 and 28. In this case, both the front hydrofoil and a pair of rear hydrofoils are suspended on parallelograms 134b and 134s, arranged lengthwise along the hull. Each set of parallelogram-linkage is mounted on a couple of horizontal cross-shafts pivotally imbedded in bearings of the hull's frame 251 and extending out of the hull having on each outer end parallelogram-levers firmly attached to said cross-shafts; two sets of cross-shafts are needed: one set for the bow and one set for the stern.

The bow retractable assembly has the above said cross-shafts arranged under an inclination of 45° so that the hydrofoil holding shank 133, pivotally mounted on swinging ends of the parallelogram levers is inclined to the same angle up forward for the purpose of sliding over freely floating objects without endangering the hydrofoils.

The stern assembly is similarly mounted on two couples of parallelogram levers 134s, arranged outboard sideways, having their cross-shafts arranged in a vertical plane. The swinging ends of these levers are pivotally attached to a retractable frame 135, to move up and down, which is in the form of H, on which a standard outboard motor-propeller unit 103 is mounted in a tilting out and back and swiveling manner on a respective bracket located in the center line of the boat running along the keel, and which frame has on the outer ends of H, L-shaped holders mounted to be freely swiveling around their vertical axis, hydrofoil gliding planes arranged in tandem form are directed forward and spaced apart and are attached to the top side of the horizontal tubular portion of each L-shaped holder, being freely swiveling around point "o" (see FIG. 26) of the vertical pivot, which is always in front of the hydrofoil gliding planes during the operation.

Both sets of hydrofoils are resiliently mounted on the frame through coil-spring assemblies 138. Each consists of a tube secured with one end to the actuating rod, in which tube a compression spring is inserted between a disc secured to the other end of the rod and the bored flanged tube-head enclosing same, through which head the other rod is made movable. The up-acting shocks are absorbed through the spring. When the boat is resting on water level, the expanded spring reaches the other head of the tube with its disc and the hydrofoils can be pushed in a positive, nonresilient way out of the water. The described spring-acting resilient unit is inserted on each to the front and to the rear directed hydrofoil actuating rod as shown in FIG. 25.

The lifting and lowering of all hydrofoils from the active to the inactive position and vice versa is done by the operator from one place through crank 137 over the worm gear fastened to the frame, a double-lever secured on the worm-gear output shaft and a set of rods, incorporating coil-spring assemblies 138b, 138s, connecting double-lever ends to the corresponding front and rear hydrofoil retracting levers, each lever secured to one of the pair of the bow and stern horizontal cross-shafts on which parallelogram levers are secured on the outboard sides. It is noted that the above-described spring cushions are, in fact, transmitting the retracting movements.

In case, the type of free-swiveling L-shaped hydrofoil holder carrying on its horizontal tubular portion hydrofoil gliding planes in tandem, spaced apart and pitched up forward as shown in FIG. 6 is to be combined with an arrangement as shown in FIG. 14, to form a three-point suspension for use on fast hydrofoil boats (not needing retraction, nor resilient mounting), requiring turbulent-free turns at high speeds, then the vertical journal of each L-shaped holder is to be made swiveling in a long bearing of a bracket; each bracket secured to the side of the reinforced boat-hull, symmetrically to the keel.

Submersible hydrofoils and submersible hydrofoil boats: Submersible hydrofoil crafts, besides fulfilling their main object, are advantageous on small crafts in unexpected storms to hide underwater, to escape the heavily rolling waves.

FIG. 23, as described before, shows a characteristic retractable mount of submersible hydrofoils on a piston rod of a telescopic hydraulic cylinder 122, which is made tiltable on a hinged top plate around the cross pin going through "o." This way it is possible to tilt the hydrofoils 7½° both ways from horizontal and to use this type of suspension for submersible arrangements.

Arrangement of FIG. 17 described previously is also submersible.

FIGS. 29 and 30 show a simplified arrangement of hydrofoils on a submersible craft able to run on the water level, with the hull above the water on hydrofoils, or submerged. Highlights of these arrangeemnts are: (1) The mount of hydrofoils is resilient. (2) Hydrofoils are retractable for operating in shallow waters and in dangerous areas and are tilting 7½° both ways from horizontal, enabling submersible operation. (3) Inclined arrangement of shanks backward down is a safety feature enabling the boat to jump over the freeely floating obstacles when hit.

In describing the features of FIGS. 29 and 29a, here one long, narrow, slant shank 141 is used, made out of thin steel strip to hold the bow hydrofoil 141a, which shank is located in a vertical plane along the keel and is inclined forward 60° to 45° from horizontal and set with its thin part against the flow. The whole hydrofoil assembly is set in a bracket 146 built into the bottom of the bow and having a narrow, rectangular, upward and slightly forward directed opening, into which fits a disc 145 having central recesses and a rectangular narrow slot through its thin part, to accommodate the slat-shank 141 in sliding-in way. Said disc is provided with an integral, slat-shank embracing guiding member 142 called a brace, tiltable around "$o_1$" and ended with an eye, for actuating push-rod 142a, operated by the navigator. The disc is secured in the bracket through a pair of pins located at "$o_1$", so it can tilt in a range of 15°. The back side of the slat-shank is provided with a rack into which a pinion 143 meshes, which is rotatably mounted in the above guiding brace 142. This pinion is actuated by a spur gear located on the stub shaft at "$o_3$" and by a chain 144 going over sprockets arranged on "$o_2$" and "$o_3$"; each sprocket is coupled with a gear positioned nearby and the whole train as described is driven from some source of power as, for instance, a hydraulic cylinder, having on its piston rod a rack, meshing into a spur gear mounted on the stud shaft located in "$o_2$"; turning in bearings of a fixed location; the resilient retraction here is accomplished through a couple of springs 152, the inner ends of which are connected to a lever of the gear and the outer ends to pins secured in a large-diameter sprocket, acting thus resiliently both ways as shown.

The hydraulic cylinder is actuated by the operator through a 4-way valve (not shown) to obtain movements of 141 up and down in a range of 2 to 3 feet.

In order to be able to transmit retracting power to rack 141 at any position of same so it can swing 15°, there are connecting rods provided between 143 and "$o_3$" and between "$o_2$" and "$o_3$", so that the proper mesh of gears and chain is always assured. Considering any location of the slat-shank 141, when the inclination of same is changed through rod 142a, then the above connecting rods simply jack-knife into an obtuse or acute angle, and the proper tension of the chain will be maintained as well as the proper mesh of gears, because of the unchanged center distances throughout; thus the retraction is performed positively for full range of the slat-shank inclination.

The retractable and pitch adjustable hydrofoil holding shank 141 is shown in three positions: In full lines, the boat with the hull above the water is gliding on hydrofoils; in hidden lines, the boat is gliding on water-level, in the regular way, with hydrofoils up in an inactive position and the same position is held when submerged for rising; in phantom lines, the boat is submerged with hydrofoils up but the craft has a descending tendency.

Assembly: The hydrofoil gliding planes 141a are attached symmetrically onto the bottom of strip 141 and the whole unit is inserted through the slot in the disc into proper location and the spur gear put in mesh with the rack. It is evident that this unit besides being retractable is also tiltable around point "$o_1$" from 60° to 45° forward through a push-rod 142a, enabling tilt of the hydrofoil gliding planes 7½° up and 7½° down from horizontal for up-going and down-going ability of hydrofoil gliding planes.

Level A indicates the boat gliding on the surface, B indicates the operation on hydrofoils with the hull above the water, C is the submerged alternate.

FIG. 30 shows a combination of retractable parallelograms with means to tilt the pitch of the hydrofoil gliding planes for use in submersible hydrofoil boats.

Because the stern part of the boat has to move sideways (through the steering action of the motor-propeller unit) the shanks 148 can be made tubular to offer less resistance (but for bow application it is best that the shank be of a thin steel strip directed with its thin edge against the flow). Shank 148 is inclined at most 60° from horizontal to front, on which bottom part, the hydrofoil gliding planes 148a are rigidly mounted so as to be behind the front smooth edge of the shank, as related to the flow, in order to prevent destruction of the foils when the shank hits a floating object; parallelogram levers 149a and 149b are arranged lengthwise in relation to the boat-hull and mounted on a couple of horizontal cross-shafts, one fixed cross-shaft 150 is rotatably mounted around "o" in the sides of the boat hull, to which shaft the above parallelogram levers 149a are secured outboard on each side of the hull, the other cross-shaft 151 with parallelogram levers 149b secured thereto is pivotally mounted on swinging ends of a couple of arms 152 of a sleeve forming a U, pivoted at "o" to relocate the movable cross-shaft in an angular displacement of 15°, from a to b.

The hydrofoil tilt adjusting means actuated from inboard by a crank and screw into a nut pivotally arranged on the end of the U-shaped lever 152 is acting on movable cross-shaft 151 to relocate same for the purpose of tilting the hydrofoil holding shank from 60° to 45° and thus to tilt the gliding planes of hydrofoils 7½° both ways from horizontal and make them go into a descending and ascending position at will.

The retraction actuating mechanism acts on the bottom rigidly set cross-shaft 150 turning around "o" through chain drive 153, actuated by lever 153c and bar 153d from inboard to retract the hydrofoils, as a unit, from an inoperative position down to an active location and vice versa.

Springs $153_b$ are arranged on both sides of the drive to make the hydrofoil suspension resilient.

Hydrofoils and the related mechanism are shown in three positions: Drawn in full lines—the boat is riding full speed on hydrofoils; in hidden lines—hydrofoils are retracted up to an inactive position for the boat gliding on the surface; in phantom lines—hydrofoils are retracted up and the shank tilted 45° for submersible operation, tending to go down. The stern arrangement of FIG. 30 can be developed for bow application as well.

A short range small hydrofoil submarine (say for 3 men only) equipped with hydrofoils in tandem form is shown in FIGS. 31, 32, 33 and 34; the craft is able to float and move on the water level, to go under water, or to glide fast-rate on hydrofoils with its hull well above the water. For that purpose, it is equipped with a positive operating mechanism of hydrofoils, where both ways tiltable gliding planes of the bow and stern are used to keep the boat on water, or above, or under at will. To reduce hydraulic friction and prevent loss of speed when negotiating curves, the stern gliding hydrofoil planes are made freely swiveling. The three-point Delta hydrofoil suspension herein adopted enables the boat to slide along the central bow-gliding planes arranged in tandem which carry most of the load, while the stern hydrofoil planes arranged on the sides of the hull are used to keep balance only.

The boat used in connection with the above said arrangement is substantially the same as the one described in previous chapters, with a bell-shaped structure 2 located on the keel approximately in the center of gravity of the boat, to accommodate a motor-propeller unit 11 m-p of Z-form with the motor located in front of the bell-shaped structure and with a tilting out and back and swiveling propeller part inside of the bell-shape structure, mounted in a water-tight way as described before, and provided with a longer down going propeller-driving king shaft, set in a corresponding housing. The boat hull is to be of a fully enclosed type provided with a man hole in the top structure of the boat, plastic dome covered, and interior equipped with accessories as disclosed thereafter.

The top structure 156 of the water-tight hull is a combination of sheet metal top with transparent plastic window panes, riveted tightly thereto. The front curved plastic windshield of a shape similar to those used in cars is also set into place. Two transparent side windows and a rear window are attached in the same manner.

On top, there is arranged a port hole 157 circular in shape, covered with a plastic hood 158 whose steel frame is on hinges and closed tight by a closure bolt 159 which could be operated from outside and inside. There is provided a simple standard periscope 160 to enable the operator to see the surface from the submerged boat. A snorkel tube 161 serves to let air into the under level submerged boat.

The most important instruments provided are the level 162, depth gauge 163 and compass (not shown). There is provided also a foot-operated double-acting 2-cylinder bailer pump 164 just in case of emergency, and for smaller boats it is manually operated on purpose, in case electric current should fail. There are four water compartments in the hull; right and left one 7f in front and a couple (right and left 7r) in the rear. They are needed in case the submerged boat should be kept at a standstill underwater. The rear ones are connected with the outside by a pipeline and provided with a drain and flooding valve 165. Front and rear compartments are interconnected by a line 166 with a shut-off valve. To flood the compartments, both valves 165 and 166 are opened; to drain them, a pump 164 has to be used in case the boat is underwater. When the hydrofoils are tilted to way-up and the motor is on, all compartments will drain themselves slowly by gravity, as the boat goes up.

The hull's reinforcing frame as shown in FIG. 32, enables mounting thereon the bow pocket 172, accommodating the bow hydrofoils 171; said frame is bifurcated in its central portion to provide a saddle for the stationary motor to be bolted on in three-points, and also to make room for the centrally located bell-shaped structure 2. This frame also provides a support for two bearings of each of the lengthwise arranged torsional rods 71, wherein the rear sealed bearing enables each torsional rod to extend outwards into the water with its integral arm 72 to carry the stern hydrofoil assembly.

The front hydrofoils: The bulk of the weight is to be carried by the front hydrofoil assembly 171 with individual gliding planes arranged in tandem, which could be made to extend beyond the motor. Each plane with its upward directed actuating lever 173 is secured on a horizontal cross stub shaft pivoted in the bottom part of pocket 172 and all levers 173 are interconnected through bar 174 to move in unison to affect the tilting of all stub shafts and all said linkage is fully enclosed in the slim, water-tight, down extended keel-pocket 172, secured to hull's frame 251. The last lever 173 is connected through a bar 176 to lever 178 of the hydrofoil operating assembly pivoted around the stub shaft 177.

The rear freely swiveling hydrofoils 181: There are a couple of them arranged in vertical pivots of sleeves 191 on the end of the arm 72, being a part of the torsional rod assembly 71. Each swiveling hydrofoil unit has basically a pocket-thin housing 186 of a rudder form ended upwards with tubular journal, swiveling in vertical sleeve 191 of above said torsional rod arm, as shown in FIG. 31, or, this vertical sleeve can be attached to some suspension means as are parallelograms pivotally attached to the hull's frame, or directly to the reinforced hull through proper brackets, as both alternates are shown in FIG. 36.

Referring again to FIG. 31, the tilting hydrofoil assembly consists of a number of horizontal cross stub shafts pivotally arranged in pocket 186, on each of which, from the outside, is secured a couple of tilting hydrofoil gliding planes 187. Each cross stub shaft has an operating lever 187a secured to and located inside of the pocket. All elever-ends are pivotally interconnected and actuated by a push-rod going through the bore of the above journal, to move up and down as is operated from inside of the boat through mechanical actuating means 182–185 as shown in FIG. 32. Or the hydraulic cylinder can be directly set over the tubular journal of pocket 186 as indicated in FIG. 36, so that all hydrofoil gliding planes of the hydrofoil unit move in unison, to enable variation of the pitch at most 7½° up and 7½° down from horizontal while the free swiveling movement is preserved.

The freely swiveling assembly in said pivot 191 set on the end of torsion arm 72, or otherwise, is preferably turning on nylon self-lubricating bushings, to enable free casting (like a caster wheel on a truck) which feature adjusts the hydrofoils according to the curve the boat is taking, to give least resistance to the flow.

Description of the hydrofoil tilting mechanism: As shown in FIG. 31, in the front part of the boat, there is one front horizontal stub shaft 177 set across the hull and similarly there is in the stern part one more rear operating stub shaft 182, extending out of the hull into the open with both its ends.

On the bow stub shaft 177 there is mounted in the middle, one operating lever 179, and another lever 178 is interconnected through bar 176 to the bow hydrofoils 171 to operate said front hydrofoil assembly; on the stern stub shaft 182, there is another hydrofoil actuating lever 183 mounted in the middle and two outside levers 185 mounted in the bracket and actuated from 182 through universal joint 184 and short shafting 182a as shown in FIG. 32. Levers 185 are transmitting operational movements to the stern hydrofoils of the freely swiveling type.

Between the two levers 179 in the bow and 183 in the stern, is mounted the hydrofoil actuating assembly 196. It consists of a double-ended lever, 199 pivotally mounted around "$o_3$" in a bearing secured to the hull. To the top end of "$o_1$" of said lever is pivotally attached a screw and nut mechanism 201, wherein the screw is actuated with a handwheel 198 rotatably arranged in the bearing attached to the hull, the handwheel being in reach of the operator; in point "$o_5$", into which is pivotally attached another screw and nut mechanism 201, interconnecting the lever 199 to bow-actuating lever 179 through an operating rod 196b; and finally to the bottom end "$o_2$" (which is the same distance from "$o_3$" as is "$o_5$"), is pivotally attached still another screw and nut mechanism, interconnecting lever 199 through rod 196s to a stern actuating lever 183, mounted in the center of stub shaft 182. Outside, there are push-rods 190 mounted in each sleeve of the torsional arms into which top disc engage lever 185, actuated from stub shaft 182; into the bottom push-rod end, then engages the slot in lever 187b of the stern hydrofoil assembly for tilting actuation up and down, while the whole is free to swivel a full 360°.

In operation, the handwheel 198 acting through a double-lever 199 upon an operating rod 196b, extending along the length of the boat to the bow, and upon an operating rod 196s to the stern, transmits operating movements to the front lever 179 and to the rear lever 183, to actuate both bow and stern hydrofoils simultaneously in unison up or down, to cause the whole boat to go up or down. In case the submerged boat has to be leveled, then the rear crank at "$o_2$" would correct the stern hydrofoils only, for slanting them more up or down, while the bow hydrofoil stays in position and vice versa, when actuating the crank at "$o_5$".

How it works: There are three basic positions of the hydrofoil operating mechanism: The level position of hydrofoils to keep the boat on the water level, the up-inclined position for gliding above the water on hydrofoils, and the down-inclined position for submerging. The bow and the stern hydrofoil assembly are normally in level position, when the indicator 167 is in the middle location. With this set-up the boat can move on the water in the old-fashioned way, having hydrofoils under the water line. Curves are made by turning the propeller unit as is shown in FIG. 32. The front upright slim hydrofoil housing 172 keeps the direction, while the stern hydrofoils swivel freely and adjust themselves in the line of travel with the least resistance. In order to lift the boat above the water level at some higher speed, it is only necessary to turn the handwheel 198 to tilt the hydrofoils up; the lever 178 located in the bow section of the hydrofoil operating mechanism tilts then the bow planes and at the same time, outer levers 185 actuate the stern hydrofoils to tilt them up for the same inclination as have the forward planes. In order to bring the boat under water, the hand wheel mechanism is turned the other way to tilt the front and rear planes of the hydrofoils down. As the boat moves forward, the hydrofoils drag it down. However, any position between can be had for best results. Practice will tell what amount of tilt for certain speed is needed to get the boat above the water or under or to travel at a fast rate with an elevated boat on hydrofoils. The boat-tilt indicator 167 located in front of the operator in order to be visible, shows in simple manner 3 basic positions of the boat: Horizontal, inclined up and inclined down.

Altimeter 168 of FIG. 31 is a simple instrument indicating the position of the hull in relation to the water level, to guide the operator to keep the hydrofoils partly submerged, when riding on choppy seas to minimize pounding, and his job is to adjust the inclination of hydrofoils accordingly. It consists of a gliding shoe 169 or a bamboo-stick located lengthwise under the hull, pivoted in "o₄". Its movements are transmitted through linkage to indicator 168 set in front of the operator, showing the position of the boat in relation to the water surface.

FIGS. 35 and 36 show improved bow and stern submersible hydrofoils in step-ladder form incorporating a tilting mechanism of hydrofoil gliding planes arranged in streamlined enclosures, suitable for a larger size of submarine, where the stern hydrofoils swivel freely for less resistance when taking curves for fast escape from an area of action.

FIG. 35 shows the bow section. The pitch adjustable hydrofoil gliding planes 222 are arranged in step-ladder form symmetrically on each side of a vertical or inclined stationary hollow sheath 221 secured to the bow of the hull. Each tilting hydrofoil gliding plane mounted on the horizontal cross stub shaft has its own pinion 223 meshing into rack 224 located inside of the hollow sheath and operated on top of same through a driving pinion 225 from some source of operation, for instance, as indicated by a chain drive.

The stern unit of the submersible hydrofoil gliding planes arranged in step-ladder form in a self swiveling housing around vertical axis of its journal is shown in FIG. 36. Each hydrofoil gliding plane is symmetrically mounted on its horizontal cross stub shaft and each couple operated by its own lever 234 engaging in the center of the swivel, the round, flanged or spiral-threaded vertical rod 235. All this mechanism is shielded in a streamlined housing 232 having a form of a rudder with an up-extended front journal, freely swiveling in a sleeve and the whole unit is carried in a strong, sideways extended bracket 231, accommodating the actuating mechanism by means of miter gears 236 which turn the vertical spiral shaft 235 one or the other direction to operate levers 234 up and down, or the vertical miter gear 236, being screwed on the shaft, secured against rotation, but free to move axially, relocates said levers 234 up and down as 236 is being turned. But besides this mechanical actuation, hydraulic means with a piston rod moving up and down to tilt the hydrofoil gliding planes can be used as well. (See a right-hand alternate of FIG. 36.)

FIGS. 37, 38 and 39 show a hydraulic system adaptable for submersible boats as shown in FIGS. 31 and 32, instead of mechanical operating means to adjust the pitch of hydrofoil gliding planes. Describing it briefly, it is manually operated for the sole reason to be always foolproof in operation and in case of emergency. The bow hydrofoils are operated through a hydrofoil actuating cylinder 96 and the stern hydrofoil assembly through cylinder 113. Said cylinders are secured to the frame of the boat and the piston rods are pivoted to the operating levers of the hydrofoils. The hand operated pump unit 241 located next to the operator's seat is in double; the left hand pump is to actuate the bow cylinder 96, and the right hand pump is for the stern cylinder 113; said pumps are connected by piping 246–247 to 4-way valves as shown in FIG. 37, and to cylinders 96 and 113.

The unit 241 is operated by one hand lever located in a selective head 244.

This selective head guided in a surrounding frame to move in a range of the piston's stroke requires the bottom end of the hand lever to be mounted on a universal joint attached to the base plate and to have a small cylindrically shaped vertically positioned disc arranged on said hand lever with its side in line and in the same height of the oppositely located horizontal and parallel piston rods, each of which has secured on its end a rectangular head in the form of U (see FIG. 39) arranged so that both channels are close together to form said rectangle. The cylindrical disc, integral with the hand lever, should be of a size to hide fully in one or the other of the two channels. It is obvious, that when the lever is kept to the left or to the right side, the left cylinder or the right one is operated as the disc is shifted from one channel to the other; and, when the hand lever is pumped in its middle position, both pistons in their respective cylinders are actuated. When the tilt of either hydrofoil system needs corrective microadjustment in advancement or retardation of one in respect to the other, it is possible to shift this selective hand-actuated device to one or to the other pump. The tandem-arranged 4-way valve unit 116 serves to reverse movements of pistons for moving hydrofoils to pitch them up or down.

It is also possible to use a separate hand lever for each pump-cylinder, with both handles, or better, knobs close to one another, so one lever can be operated, or the other, or both with one hand.

A strong frame able to take-up all the stresses from the power unit and the hydrofoils is a necessity for the foolproof operation of hydrofoil boats. It is the backbone of hydrofoils. The one shown herein in FIG. 40 is especially suitable for assemblies shown in FIGS. 18, 19, 20 and 23 and also for a boat shown in FIGS. 25 to 28. Its chief advantage is that it can be fabricated separately and slipped into the hull and secured one to the other. This type of frame takes care of all stresses and loads coming from the power plant and from the hydrofoils. The hull's job is then to keep water out and to accommodate passengers.

The frame intended for a hydrofoil boat using a retractable suspension of hydrofoils through parallelograms, consists of a main frame-body 251, fabricated preferably out of duraluminum as an all-welded rigid construction to which, in front, two cross-bars 252 and 252' are welded, and provided on ends with flanged unions 253 and 253'. To the top cross-bar, extension pieces 254 and 254' are mounted on each end, which outer ends reach somewhat out of the hull. Similar simpler extension 255 and 255' are mounted on the lower cross-bar, to extend somewhat (say 4") out of the hull. Into those extensions, parallelogram shafts are mounted. The stern part of the frame is provided with a transom mounting plate 256, to accommodate the hydrofoil and motor-propeller holding brackets shown in FIGS. 19 and 20 and various other attachments listed previously, as is the bracket of FIG. 7, or attachments shown in FIGS. 12 and 13. The front curved portion of the frame is made to reinforce the hull's bow and can also be made with a small mounting plate to accommodate hydrofoils thereon with their mounting brackets as, for instance, shown in FIG. 23. In case there is a motor-propeller unit mounted in the middle of the boat's hull, then the frame is bifurcated in said location or two parallel longitudinal frame members can be adopted. Torsional rods for the hydrofoil resilient suspension, as shown in FIG. 16 and in FIG. 32 are to be attached to this frame lengthwise.

The frame, as described, is to be prefabricated in a welding fixture to have proper dimensions and it is then slipped into the boat-hull (which is also prefabricated in fixture) and both units are clamped rigidly together in at least 3 points with suitable brackets and bolts in a water-tight manner. Front extensions 254–254' and 255–255' are then mounted on and sealed with rubber bellows to the hull. Stern plate 256 is bolted to the bracket of hydrofoils 111 of FIG. 20, so that the transom of the hull is in between with a suitable rubber pad.

Said frame can be modified to any arrangement of power units and to any type of hpdrofoils, and with mounting brackets for various attachments.

Examples given, described and claimed show only the simplest characteristic methods of solution, not hindering the possibilities of developing the basic idea further, and should not limit the full scope of the invention. All the improvements described, may be used individually or in any combination.

I claim:

1. An improved boat hull, suitable for ordinary, hydrofoil and submersible hydrofoil navigation, having arranged in its bottom part, from amidship to the stern, an air-tight and water-tight bell-like elongated structure secured along the keel to the boat-hull, said bell-like structure being open to the water-side and large enough to accommodate the propeller part of a motor-propeller unit and to allow its movements therein, said bell-like structure having a top flanged opening above the water level when the boat is afloat, said flanged opening being large enough to insert through same said propeller part of a motor-propeller unit to extend into the water; an exhaust line from the engine exhaust manifold directed into the space of said bell-like structure and capable of filling said space completely with exhaust gases which, when the motor is in operation, has a boat-lifting ability, and a hydroskimming effect at cruising speed; a prefabricated rigid frame, adapted for the mounting thereon of the motor-propeller unit and hydrofoils including resilient mounts to lessen shocks from active hydrofoils and adapted for the mounting thereon of means for retracting the hydrofoils, said frame comprising of a reinforced longitudinal beam located along the keel and bifurcated to bypass the elongated bell-like structure and extending the full length of the boat, said frame being inserted into a prefabricated hull and fastened thereto in at least three points, this frame being adapted for the mounting of brackets for securing the hydrofoils, said hydrofoils being arranged as a pair at one end of the hull and singly at the other end of the hull and being symmetrical to the keel to form a 3-point hydrofoil suspension, said frame having a saddle located on the bottom of the hull in the keel in front of the bell-like structure to accommodate a stationary inboard motor; the above-mentioned frame having a front curved upright portion for reinforcing the hull's bow and an upwardly directed mounting plate located in the stern and secured to the hull to form a compact transom; a couple of cross-members for holding each hydrofoil unit, said cross-members being secured to the frame and extending out of the hull and being sealed to be water-tight and having mounted thereon the retractable hydrofoils secured by parallelogram suspension mountings in such a way, that the boat-hull is free from any strain resulting from the operation of the motor-propeller unit and the hydrofoils.

2. In a boat hull for water navigation as described in claim 1, said bell-shaped structure having in its front part with an upwardly inclined mounting flange an opening for a through-going-drive shaft from the motor, said flange being arranged under the same angle that the present transoms have, and being centered in a vertical plane along the keel to accommodate a Z-shaped motor-propeller unit in an air- and water-tight manner, with a stationary motor mounted in the hull in front of the bell-shaped structure, and the propeller unit mounted inside the bell-shaped structure and secured to the mounting flange of same, and a steering means in the form of a double-ended lever having a steering handle on one end, and said double-ended lever mounted pivotally onto the top of the blind flange of the bell-shaped structure; the other end of the double-ended lever being hooked onto the steering mechanism of said Z-shaped motor-propeller unit.

3. In a boat hull for water navigation as recited in claim 1, adapted to accommodate in its stern part a modified Z-shaped motor-propeller unit having the motor portion mounted inboard and the revolving propeller portions for a two propeller-arrangement mounted outboard on a revolving housing with an integral horizontal journal, said boat's hull having its inclined transom part under the same angle as the existing transoms have and secured to the reinforcing frame, and each of the hull's transom and the transom mounting plate of the frame having an opening concentrical with the horizontal crank-shaft-extension, to permit mounting of a revolver bearing therein on the reinforced transom, said bearing to accommodate the above-mentioned revolving journal of the outboard propeller portion, and the bifurcated part of the above said reinforcing frame attached to the transom, having an inboard motor-accommodating saddle located in front of the transom mounting plate.

4. An improvement of a standard outboard motor-propeller unit, in the combination of claim 1, of an L-form having its motor with a vertical crankshaft in line with the down-directed king shaft, and a horizontal propeller stub shaft, set in the propeller housing arranged on the bottom of the king shaft housing and the propeller driven through a bevel gearing from said king shaft, to be used in ordinary, hydrofoil and submersible hydrofoil boats for inboard air-tight and pressure water-tight flanged mount on the bell-like structure, wherein the king shaft housing has directly under the cylinders of the motor, a machined-out cylindrical recess to form a vertical journal, to accommodate thereon a flanged tilting-out and back and revolving joint, which has embodied in it a spherical body with extended-out horizontal short pins on both sides, said body bored centrally upright to serve as a bearing for the journal of the king shaft housing, said spherical body imbedded in an air-tight and water-tight way in a horizontal mounting flange which has a central opening and an inclined flanged enclosure having a central opening so that the sphere can tilt therein as it has its vertical bore free from the vertical axis to a 45° inclination, the whole unit mounted to turn freely on the journal of the king shaft housing and secured against vertical dislocation by a bottom portion of same, the complete motor-propeller unit, including the propeller housing and the propeller, set with said flanged mount onto the top annular horizontal flange of the hull's bell-shaped body and bolted thereto, so that the sphere has its horizontal axis crosswise to the keel and the king shaft housing can tilt in the thus-formed joint from vertical to 45° backwards in order to protect the propeller shank when hitting an obstacle and to turn in its journal bearing a full 360° both ways for the purpose of steering; a runner assembly with a freely moving runner in a bracket secured to the motor's underside in the same vertical plane with the propeller, the bracket provided in its bearing with a horizontal eccentric stub shaft directed to the centerline of the king shaft, said stub shaft accommodating the runner in such a way as to adjust, through a short lever secured to the end of the stub shaft, the height of the runner in relation to the motor for the proper pitch of the propeller, the runner to move freely around the top edge of the stationary motor flange as the motor-propeller unit is being steered, to take-up moments produced by a thrust of the propeller, with free movement off the rim, in case the motor-propeller unit should strike a floating obstacle, so that it would tilt-out of a propelling position and go back through the forward push of the propeller; and an exhaust line from the engine led from the cylinder's exhaust ports through the tilting and swiveling joint passage down to the outer bell-shaped structure space, pushing out all water from said space and creating thus a hydroskim effect therein, so that during its cruising speed the boat skims on a cushion of exhaust gases to reduce hydraulic friction.

5. A motor-propeller unit in the combination of claim 1 having a telescopic propeller tube revolving around its vertical axis, said tube arranged in the stern part near the center of gravity of a boat on a bell-shaped structure and guided vertically by a Peaucellier straight line motion linkage unit having a couple of fixed fulcrums horizontally set in a plane radial to the propeller tube axis in which plane the linkage is moving, having all pivots horizontal and cross-wise set to the keel, the pivots of said linkage moving in a straight line attached to a collar set on a propeller tube in a turning way but axially secured thereto, which propeller tube is movable up and down in a straight vertical line as this telescopic tube is made to go through an antifriction linear and revolving bearing in a sealed off flanged mount of said bell-like structure to be air- and water-tight, said telescopic tube accommodating inside a turning king shaft on antifriction bearings to drive the propeller; a propeller housing secured to the bottom end of a revolving telescopic tube comprising a horizontal stub shaft with a propeller secured on its outer end, driven from the king shaft through a bevel gearing located in the propeller housing; a stationary motor located in the saddle of the frame forward to the telescopic tube incorporating power transmission means to drive the vertical king shaft from the output shaft of this power unit in such a way as to enable vertical movement and turning of the propeller tube in a full range while the power is transmitted without interruption; means to steer the telescopic swiveling tube through a steering wheel horizontally arranged and secured to the top end of the telescopic tube to enable steering while the propeller is in any of the three locations, namely, I-hidden, II-normal, and III-for hydrofoil operation; means to adjust the telescopic swiveling tube into three said positions I, II and III in a way, to move the same up positively and to go down freely by gravity; and a safety device to lift the propeller unit including the telescopic tube, comprising a ball of a universal joint located in the centerline of the telescopic tube and secured to on the very bottom of the propeller housing, into which ball is engaged a lift-bar having the other end directed forward to the bow and tilting in a shoe, which slides longitudinally in a guide-groove along the keel, said lift-bar to life the whole telescopic unit through its universal joint into hidden position when it hits a freely floating obstacle and allowing the same to drop by gravity to a previously set location after the obstacle was passed.

6. The structure of claim 5 including a motor-propeller unit for an inboard mount on the top of an elongated bell-shaped structure arranged in the stern part near the center of gravity of a boat and having a vertical telescopic and swiveling propeller tube, said tube being guided in a Thomson linear and radial antifriction bearing unit located on the top of the bell-shaped structure and sealed against water, the other Thomson bearing located in the ceiling of the hull, along the same centerline of the telescopic tube extension; the motor rigidly mounted on the top end of the lower portion of the telescopic and swiveling tube in a C-shaped bracket formed to make room to drive the king shaft; and, power transmission means to drive the vertical king shaft from said motor which comprises a drive means having one driving member on the upright motor output shaft, the other driven member secured on the top end of the king shaft and means to transmit power from one member to the other, and further, to the propeller.

7. The structure of claim 3 including an improved motor-propeller unit of Z-form with a stationary inboard motor imbedded in its saddle of the frame, said motor located in front of the boat's transom and the two-propeller unit mounted outboard on a transom mounting plate of a hydrofoil boat, having two propeller shanks 180° apart, arranged on a swiveling end of a revolving body which is turning with it journal in a horizontal revolver-bearing, set into the opening in the transom and secured thereto centrally around an extended-out horizontal shaft of the motor crankshaft; a horizontal swiveling shaft, arranged rotatably in the swiveling end of said revolving body, this shaft connected to said horizontal crankshaft extension by a universal joint located at the point of intersection of the crank-shaft extension, going through the revolver and the upright axis of the swiveling end of the revolving body wherein the short shank, pivoted on the swiveling end of the revolving body, is arranged in a self tilting out and back way and its propeller driven from the horizontal swiveling shaft, thus described unit to be used for normal operation on the water level, and the other longer shank integral with said swiveling end and having its propeller driven from the same horizontal swiveling shaft, to be used for hydrofoil operation; both shanks made swiveling around the upright axis of the swiveling end of said revolving body for the purpose of steering, comprising a bevel gearing, set centrally with the above said universal joint, one bevel gear secured to the swiveling end in line with the upright axis, and the other gear on a concentrical sleeve going through the revolver mechanism, having inboard an own sprocket secured in this sleeve to be actuated by transmission means from the steering wheel; said propeller assembly also having means for revolving the above mentioned revolving body including the swiveling end with shanks thereon by an integral journal which goes through said horizontal bearing, set firmly in the transom, and this journal provided on the inboard end with a sprocket and actuation means to affect the revolving, and a lock actuated also from inboard, securing either shank in an operative position through a manually disengageable pin, meshing into one of the 180° apart holes in the sprocket to affect the locking.

8. In a hydrofoil arrangement as claimed in claim 1 comprising a boat hull, a hull's reinforcing frame with a strong stern transom mounting plate, a combination of a standard steerable and tilting out outboard motor-propeller unit of L-form and a hydrofoil, both arranged outboard on a common bracket assembly and retracable in a stationary frame mounted from the outside on said transom plate reinforced by a boat frame, comprising a retractable holder, positively guided up and down in guiding members of this stationary frame, means to slide the holder in said frame actuated from inside of the boat, the above mentioned holder having an out-extending integral upright mounting angle to carry a motor-propeller unit attached in the regular way as is presently practiced through two transom C-clamp bolts to enable the motor-propeller unit to swivel for steering and to tlit out when the propeller-end hits an obstacle, and to automatically come back afterwards; a sheet-metal fabricated body firmly attached to a sliding retractable holder; this body streamlined against water-flow and extending down into the water to firmly hold the hydrofoil gliding plane and the whole unit being retractable up and down so that the pitch of the hydrofoil gliding plane remains unchanged all the retractable way, said hydrofoil gliding plane aranged in the same horizontal plane as is the anticavitation plate of the motor-propeller unit; the above mount to be movable up and down to such an extent that the anticavitation plate of the motor-propeller unit with the hydrofoil gliding plane to be on the water level when the boat is floating, and for said hydrofoil active position of said hydrofoil gliding plane with the anticavitation plate of the motor-propeller unit to be submerged at least two feet under the water level, so when the boat is gliding on the hydrofoils at proper speed, it would lift itself that much.

9. The combination of claim 8, having a hydraulic cylinder made retractable up and down in guides of a startionary bracket mounted rigidly to the transom, and the piston rod of the cylinder secured to an up-extended holder of same bracket so the cylinder is movable up and down and the piston rod is stationary; an L-shaped bracket secured to the cylinder to accommodate a standard outboard motor-propeller unit bolted to it through C-clamp bolts in a way to retain its steering and tilt-out and back movements; a streamlined extension of a cylinder secured to its bottom part and reaching water level, having the hydrofoil gliding planes attached thereto so that the top one will be level with the anticavitation plate of the motor-propeller unit; and, operating means to make the unit movable up and down in said bracket through a hydraulic medium from inside of the boat through a four-way valve, hydrulic pump and connecting flexible piping, said hydraulic system working in a range between the inoperative to the active location of the hydrofoils and vice versa.

10. The structure of claim 1 including a tandem arrangement of the hydrofoil gliding planes for producing lift by a forward motion in a liquid medium for the hydrofoil boats, wherein each hydrofoil unit is composed of a rigid frame having a horizontal tube distanced from the hull into said liquid medium and parallel with the keel; an integral front part with said horizontal tube inclined forward and secured to the boat hull's frame, this inclination of the front part to be between 45° to 60° from the horizontal for the purpose of gliding over freely floating obstacles; the rear part of same horizontal tube secured to the hull's frame and a number of narrow hydrofoil gliding planes arranged so that the frontal area offers least resistance to flow in order to minimize the pounding effect of waves, and spaced in tandem apart, and each pitched up forward and individually secured to the top part of said horizontal tube of the rigid frame to be protected from injury, these units arranged on the hull in a minimum of three, thus to form a 3-point suspension.

11. The structure of claim 10 a tandem arrangement of the hydrofoils, wherein for applications requiring a free-swiveling set-up for turbulent-free turns at higher speeds, in combination with rigid ones, to form at least a 3-point suspension of hydrofoils, an L-shaped hydrofoil holder, freely swiveling around its vertical axis in the bearing of a bracket attached to the hull's frame, said holder having hydrofoil gliding planes in tandem pitched up in a forward direction, spaced apart and secured to the top side of its horizontal tubular portion to be protected from floating obstacles; and, the swiveling holder having its vertical pivot always in front of the hydrofoils when in operation.

12. The combination of claim 1 having an arrangement of hydrofoils with the variable pitch of the hydrofoil gliding planes for use in submersible hydrofoil boats, comprised of a vertical stationary slim streamlined pocket body with an inclined forward edge at least 60° from the horizontal, said pocket body located under the keel and set along same in the line of flow, having horizontal tilting stub shafts arranged crosswise in the bottom part of said pocket; an upward directed actuating lever located inside of the pocket and secured to each cross stub shaft, all actuating levers interconnected through a bar so that the tilting of all cross shafts are in unison; said upright levers are further connected to the hydrofoil pitch actuating means provided inboard to affect the tilting of the hydrofoil gliding planes which are secured to the outside ends of each cross stub shaft to tilt up and down a maximum of 7½° from the horizontal both ways, to make the boat go up and down as it is being propelled forward.

13. The combination of claim 12 including a stern hydrofoil unit, free-swiveling for least resistance to the flow of water and having an adjustable pitch of hydrofoil gliding planes, to form at least a 3-point suspension, for water navigation of submersible hydrofoil boats, having a vertical pivot of each unit swiveling in a sleeve of a suspension means attached to the boat's hull; each unit composed of a pocket-thin housing of a rudder form ended upwardly with a tubular journal pivoted in said sleeve, the pocket housing accommodating in its inner bottom space pivotally arranged horizontal cross stub shafts, on each end of which a tilting, hydrofoil gliding plane is secured, each cross stub shaft to have an operating lever secured thereto and located inside of the pocket; all lever-ends pivotally interconnected and actuated by a pushing rod going through a bore of above said journal, and this push-rod operated from inside of the boat to move up and down, so all the hydrofoil gliding planes of the hydrofoil unit tilt in unison to enable variation of the pitch at most 7½° up and 7½° down from the horizontal, while the free swiveling movement of this hydrofoil unit is preserved.

14. The structure of claim 1 including a retractable suspension means of hydrofoils using parallelograms, an improvement of said parallelogram suspension, comprising a combination of a retractable parallelogram with means to tilt the pitch of the hydrofoil gliding planes, having on each side of the hull a long steel shank inclined a maximum of 60° from the horizontal to the front, on the bottom part of which the hydrofoil gliding planes are rigidly mounted so as to be behind the front smooth edge of the shank as related to the flow, in order to prevent destruction of the foils when the shank hits a floating object; the shank articulated in parallelogram linkage with parallelogram levers arranged lengthwise in relation to the boat-hull, mounted on a pair of horizontal cross shafts, one fixed cross shaft rotatably mounted in the sides of the boat-hull, to which shaft the above said parallelogram levers are secured outboard; the other cross shaft wtih parallelogram levers secured thereto is pivotally mounted on the swinging ends of a pair of arms secured on a sleeve forming a U, pivoted around the other cross shaft of a fixed position which U-formed member is made to relocate the movable cross shaft in an angular displacement of 15°; hydrofoil-tilt adjusting mechanism actuated from inboard, acting on the movable cross shaft to relocate same for the purpose of tilting the hydrofoil holding shank from 60° to 45° and so to tilt the gliding planes of the hydrofoils 7½° both ways from horizontal to direct them to a descending and ascending position at will, and retraction-actuating means, acting on a rigidly located cross shaft and operated from inboard to retract the hydrofoils as a unit from an inoperative position to an active location, and vice versa.

15. The combination of claim 1 having retractable means for hydrofoils with a pitch-adjustable mechanism of hydrofoil gliding planes for use in submersible boats, having a telescopic hydraulic cylinder arranged inclinably in a vertical plane set along the keel; this cylinder mounted on a hinge tiltable from inside of the boat through a lever-actuating means and this hinge secured to the top bow end of a boat, and the cylinder mounted in a way to hang down on the front part of this hinge which has a horizontal pivot set crosswise in relation to the keel to enable a tilt of the cylinder 60° to 45° from horizontal; the hydrofoil gliding planes arranged behind the farthest out-extended piston rod in regard to flow, so the boat can jump over a floating obstacle when struck without endangering the hydrofoils; and the tilt of the cylinder to impart to the gliding planes of the hydrofoils a pitch of at most 7½° up and 7½° down from the level needed for submersible operation.

16. The combination of claim 1 having retractable and pitch adjustable hydrofoils for submersible hydrofoil boats, having a long, thin steel slat shank located in a vertical plane set along the keel and directed with its thin edge against the flow and inclinable 60° to 45° forward from horizontal, said combination having a bracket located in the bottom part of the bow and secured to the hull, this bracket provided with a rectangular opening to accommodate a thin circular body in a shape of a disc set in the bracket in a tilting way by means of two side-pins engaging into central circular recesses of said disc which has a through going rectangular slot to accommodate the long thin slat shank in a sliding way; a brace to embrace and to hold in position the above said slat shank and to actuate inclination of same 60° to 45° from horizontal; this brace being integral with the above-mentioned disc, is extended way above same and ends with an eye for engagement of a push-rod, to tilt same around the center of the side pins, so that the hydrofoil gliding planes attached to the bottom part of the slat shank can tilt 7½° up and 7½° down from horizontal; a spur gear pinion located close to the disc and set with its stub shaft in two bearings on the brace, said pinion engaging into the rack of the back side of the slat shank to retract same as the pinion is rotated through the transmission means from a stationary source of power actuated by the operator from inboard, the retracting being performed positively for full range of slat shank inclination.

17. The combination of claim 1 having a rectractable and resilient mount of hydrofoils consisting of a boat hull with an integral reinforcing frame; hydrofoil gliding planes heading forward with respective shanks and holders pivotally mounted on articulated levers forming a parallelogram secured on a pair of horizontal cross shafts pivotally imbedded in bearings of the boat hull's frame, wherein two sets of cross shafts, one for the bow and one for the stern are needed; a hydrofoil retracting lever secured to one cross shaft of each retractable and resilient hydrofoil-sdspension combination; a retraction-actuating double-lever pivotally mounted in its center on the boat hull's frame to move both the bow and the stern hydrofoils from an inactive to an active position and vice versa through an operator-actuated power transmission means; connecting rods, interconnecting above said double-lever ends to corresponding swinging ends of the hydrofoil retracting levers for the bow and the stern hydrofoil incorporating a coil-spring cushion assembly mounted on each of the above-mentioned connecting rods, using a coil spring as a resilient element, said coil spring assembly consisting of a tubular body enclosed on one end and secured to one end of the actuating connecting rod on the parallelogram side; a movable disc accommodated in said tube, said disc secured to the other end of the actuating rod to be in the same center-line; a compression coil spring put on the later said rod side and both inserted inside the tube and enclosed through a flange wherein the later said rod is going through this flange freely; the complete assembly having its resilient unit always between the retraction actuating lever and the hydrofoil retracting lever secured on one of the parallelogram cross shafts; this spring cushion unit thus transmitting the retracting movement one way to the hydrofoil active position in a resilient manner, the other way into an inactive position, in a nonelastic way.

18. The combination of claim 17 having a retractable and resilient mount of hydrofoils, using torsional rods as resilient suspension means of hydrofoils, located in a couple parallel and symmetrical to the keel, each set imbedded in two bearings of the boat hull's frame having one end extending out of the hull, to which end one parallelogram lever unit is secured to form an out-extended arm, while the other above and parallelly-set lever is pivotally attached to the bracket of the hull's frame; and, on swinging ends of this thus formed parallelogram-linkage is a pivotally attached shank holder with hydrofoil gliding planes arranged in the bottom part of same in a forward direction and said shank holder keeps its upright position during the retraction and on the inboard end of each torsion rod a retraction-actuating lever secured thereto and having two positions, retracted up and down, which retracting movements are to be transmitted resiliently to the hydrofoils through the torsional rod, and said actuating lever of each unit then fixed to the frame to hold the hydrofoils in a set position.

19. In the combination of claim 1 a shock-proof mount of hydrofoils for hydrofoil boats, a resiliently acting hydraulic system, having the hydrofoil retracting hydraulic cylinder provided on the pressure piping side, which pushes the hydrofoils down into an active position, with a shock absorber consisting of an additional cylinder, with a shorter stroke, one side connected to the pressure piping and on the other side of the shock-absorbing cylinder, the piston being spring-loaded to enable the system to absorb shocks from the active hydrofoil and this spring-loaded side provided with a drain pipe to return leak oil back to the oil reservoir.

20. The combination of claim 1 means to actuate the pitch of the hydrofoils of a submersible boat to make the boat descend and ascend as it moves forward, having one operating handwheel with its shaft rotatably mounted in a bearing attached to the boat's hull and the handwheel located within reach of the operator; and a mechanism to transform rotary motion of said handwheel to linear, actuating a double-ended lever with its central fulcrum positioned on the boat hull's frame; one swinging end of said double-ended lever connected to the hydrofoil actuating lever of the bow, and the other end to the hydrofoil actuating lever of the stern through respective operating rods, where each rod is having means reached by the operator, to change its length to adjust the pitch individually of either front and stern hydrofoil, and with the operating handwheel the whole to be actuated in such a way that the pitch of the bow and the stern hydrofoils are adjusted in unison.

21. The combination of claim 20 including operating mechanism used for hydrofoil and submersible hydrofoil boats to adjust the pitch of the hydrofoil gliding planes, having a hydraulic actuating means composed of one hydrofoil actuating cylinder located in the front and connected to the bow hydrofoils to tilt the hydrofoil gliding planes and the other cylinder located in the rear part of the boat to tilt the stern hydrofoil gliding planes; said cylinders secured to the boat-frame and the piston connecting rods pivoted to operating levers of the hydrofoils; a pump unit comprised of two hand-operated pumps to serve the bow and stern cylinders separately, actuated from one operating lever having its integral actuating disc vertically and parallelly set with pistons, said disc positioned in a selective head guided horizontally in the slides of the surrounding frame to move in line and in range of the piston's stroke, this head composed of two identical units, each securely mounted on oppositely arranged horizontal parallel piston rods to form a channel so that both are close together forming a rectangle, each channel to accommodate the actuating disc of said operating hand lever, enabling same as it is on a universal joint and this joint attached to the base plate, to shift sideways from one channel into the other, to engage either channel respectively, and both to actuate either one pump and both at will, wherein the operating lever and 4-way valves are to actuate and reverse piston movements, and said hydraulic components being interconnected with pressure and return piping; this double pump unit arrangement operating both the bow and the stern cylinders and either one in order to obtain movements of both hydrofoils in unison, to be tilted up and down, and for corrective microadjustments, either hydrofoil to be adjusted individually.

References Cited by the Examiner

UNITED STATES PATENTS

| | | | |
|---|---|---|---|
| 190,312 | 5/1877 | Gray | 115—41 |
| 1,001,260 | 8/1911 | Evinrude | 115—41 |

(Other references on following page)

UNITED STATES PATENTS

| | | | |
|---|---|---|---|
| 1,344,903 | 6/1920 | Koiransky | 114—66.5 |
| 2,633,817 | 4/1953 | Pedranti | 115—18 |
| 2,720,180 | 10/1955 | Von Schertel | 114—66.5 |
| 2,748,400 | 6/1956 | Kregal | 114—66.5 |
| 2,795,202 | 6/1957 | Hook | 114—66.5 |
| 2,929,346 | 3/1960 | Perce | 114—16 |
| 2,955,559 | 10/1960 | Palmer et al. | 114—66.5 |
| 2,975,750 | 3/1961 | Smith | 115—41 |
| 3,016,864 | 1/1962 | Woodfield | 114—66.5 |
| 3,075,490 | 1/1963 | Lang | 114—66.5 |
| 3,121,414 | 2/1964 | Peterson | 114—66.5 |

FOREIGN PATENTS

| | | |
|---|---|---|
| 517,518 | 2/1931 | Germany. |

MILTON BUCHLER, *Primary Examiner.*

FERGUS S. MIDDLETON, *Examiner.*

A. H. FARRELL, D. P. NOON, *Assistant Examiners.*